US007431176B2

(12) United States Patent
Bauman

(10) Patent No.: US 7,431,176 B2
(45) Date of Patent: Oct. 7, 2008

(54) DISPENSING MACHINE TO STORE AND DISPENSE ELONGATED CONTAINERS VERTICALLY

(75) Inventor: Barry B. Bauman, Kitchener (CA)

(73) Assignee: Barryco Technologies Inc., Kitchener, Ontario (CA)

( * ) Notice: Subject to any disclaimer, the term of this patent is extended or adjusted under 35 U.S.C. 154(b) by 228 days.

(21) Appl. No.: 11/154,553

(22) Filed: Jun. 17, 2005

(65) Prior Publication Data

US 2006/0283872 A1 Dec. 21, 2006

(51) Int. Cl.
*B65G 59/00* (2006.01)

(52) U.S. Cl. ........................... 221/22; 221/23; 221/115; 221/131; 221/133; 221/237

(58) Field of Classification Search .......... 221/1–312 C
See application file for complete search history.

(56) References Cited

U.S. PATENT DOCUMENTS 4,632,274 A * 12/1986 Garbe ......................... 221/96
5,044,517 A * 9/1991 U Park ........................ 221/11
5,172,828 A * 12/1992 Ficken et al. .................. 221/11
5,605,249 A * 2/1997 Gonyea ......................... 221/6
5,732,852 A * 3/1998 Baker et al. ................. 221/116
6,902,084 B2 * 6/2005 Bauman ..................... 221/115
2006/0169714 A1 * 8/2006 Holdway et al. ............ 221/289

* cited by examiner

*Primary Examiner*—Gene O. Crawford
*Assistant Examiner*—Michael K Collins
(74) *Attorney, Agent, or Firm*—Daryl W. Schnurr

(57) ABSTRACT

A dispensing machine for elongated containers has a plurality of clusters arranged within a housing. The clusters each have an actuator and comprise four tubes that are bound together with an interstice along a central axis of the cluster. The actuator is mounted in the interstice and each cluster is supported by a first bracket. A plurality of clusters are mounted from front to rear in the housing with the first brackets being removably mounted in a retainer. The clusters in the retainer form a set and can be tilted forward to replenish the tubes with containers. There are several sets side by side within the housing. The clusters of each set are held in place by one attachment that can be opened without tools to remove the clusters of that set.

27 Claims, 25 Drawing Sheets

Figure 7
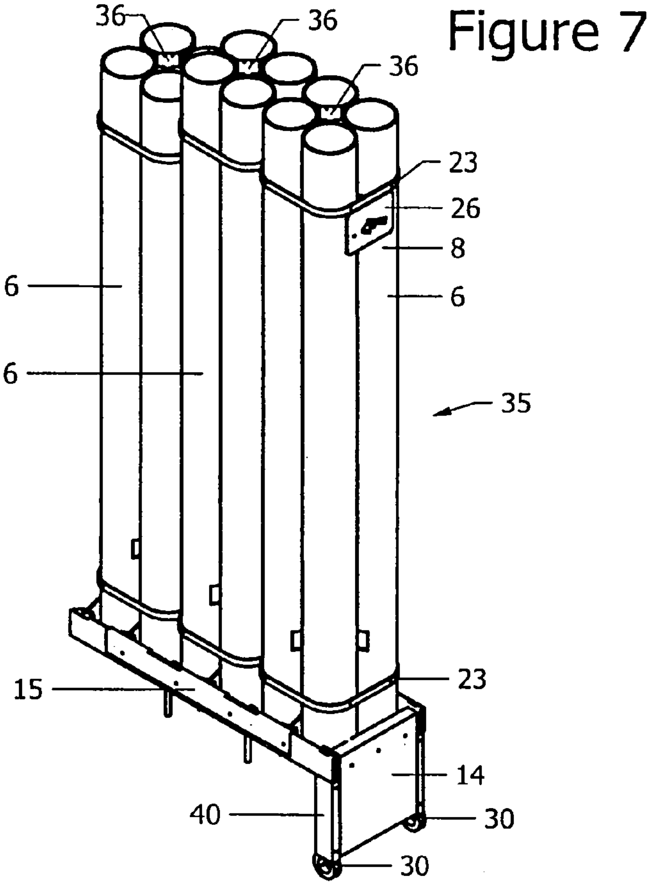
Figure 8
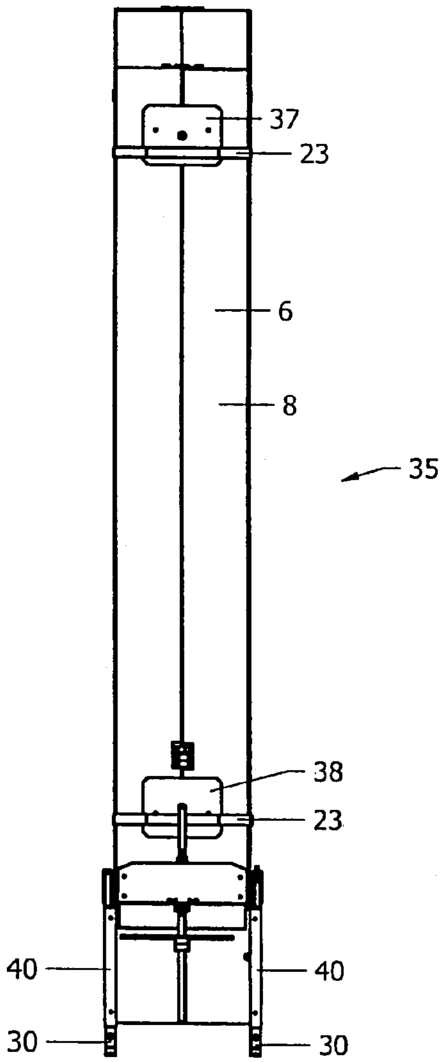
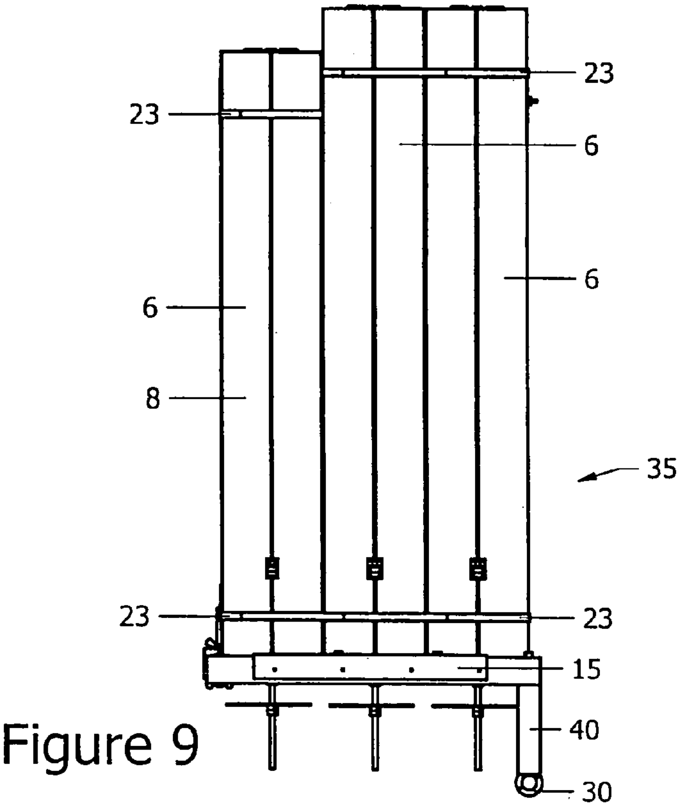
Figure 9

Figure 15
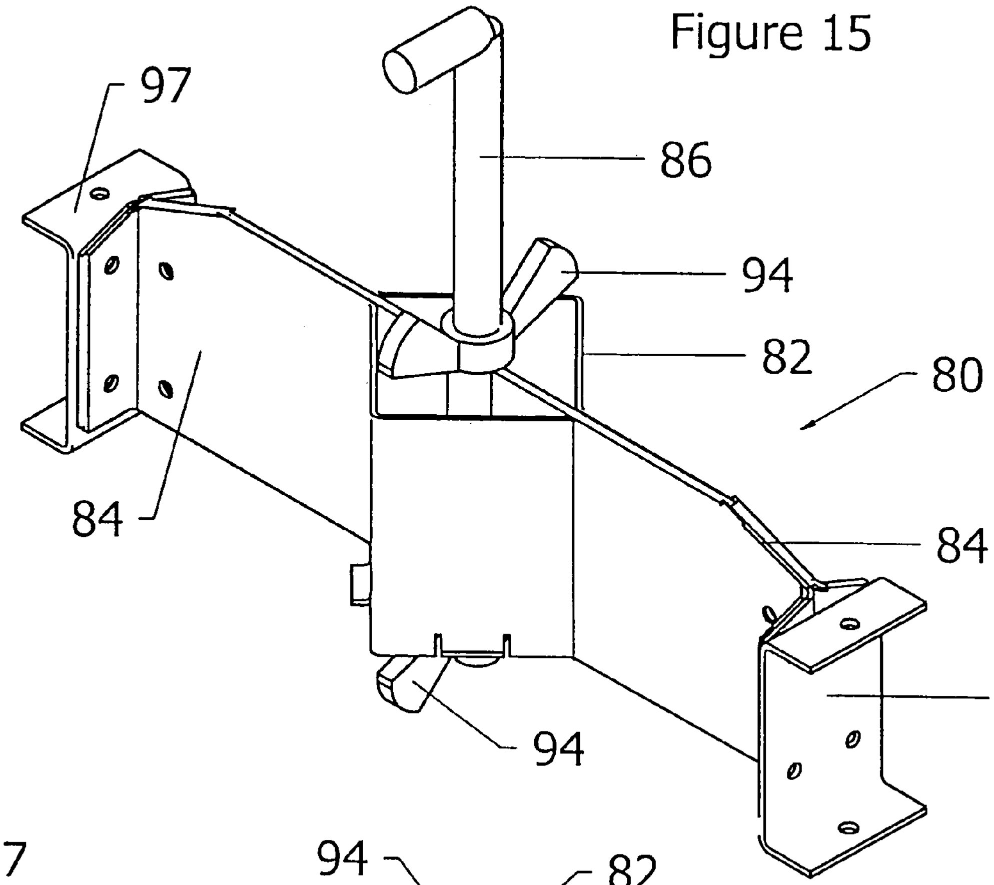
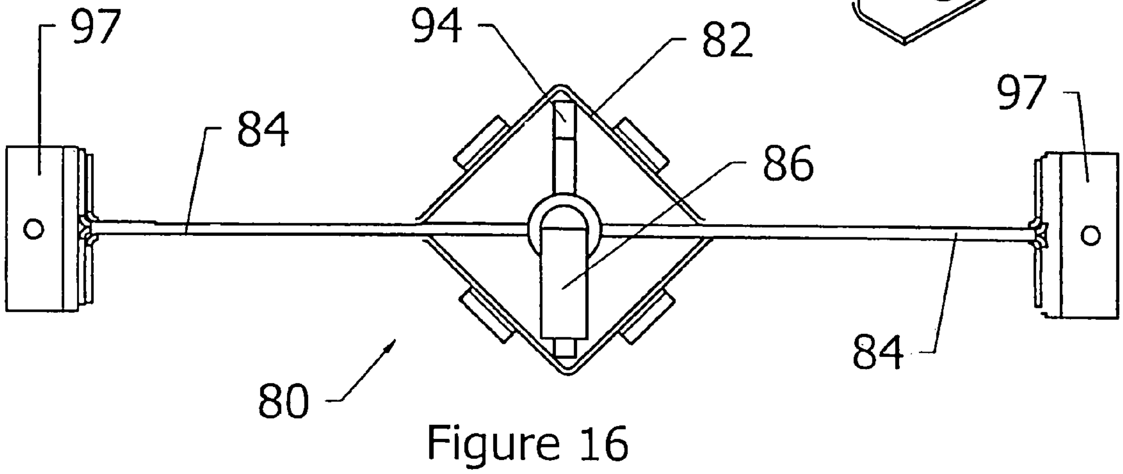
Figure 16

Figure 19
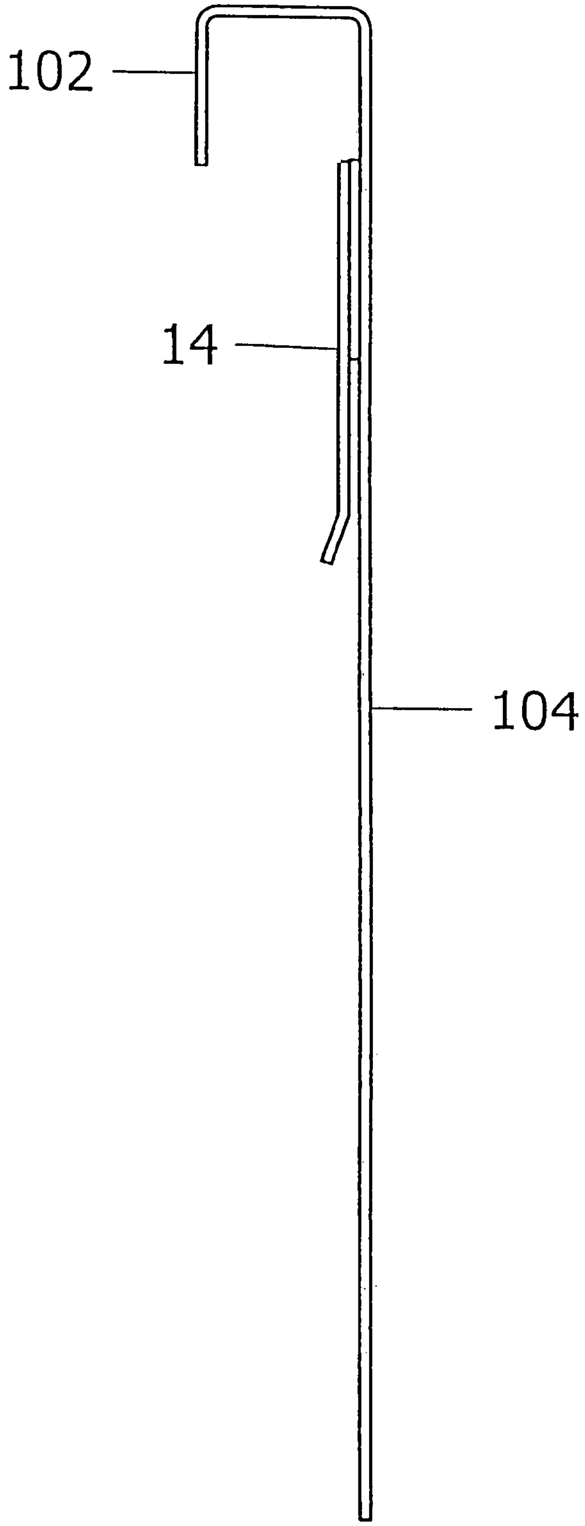
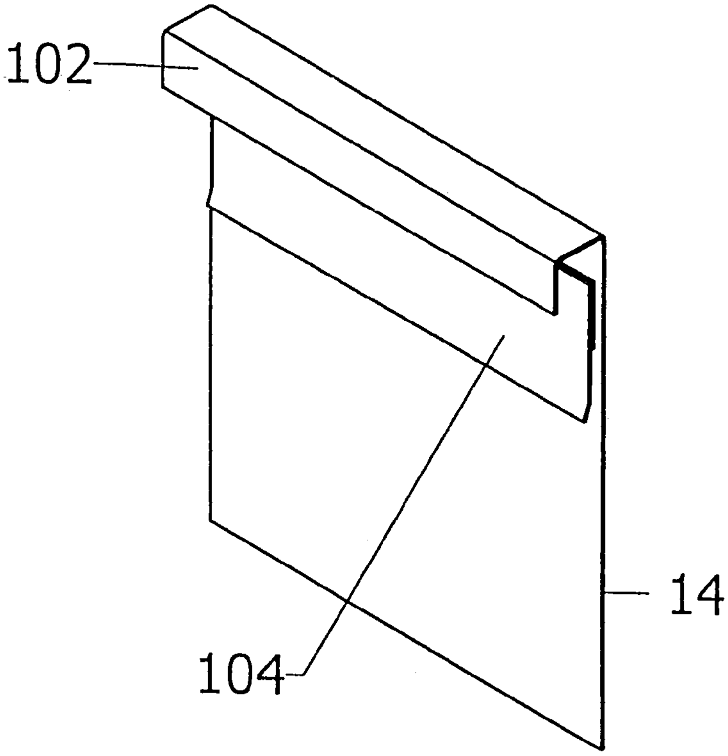
Figure 20

Figure 29
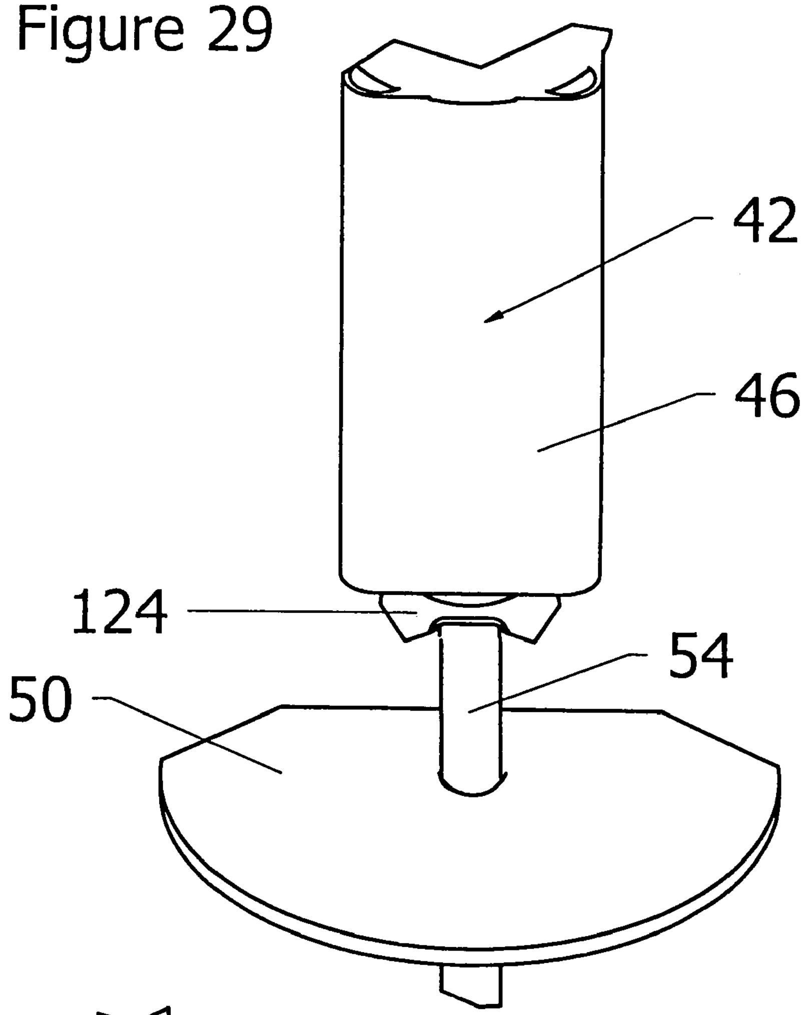
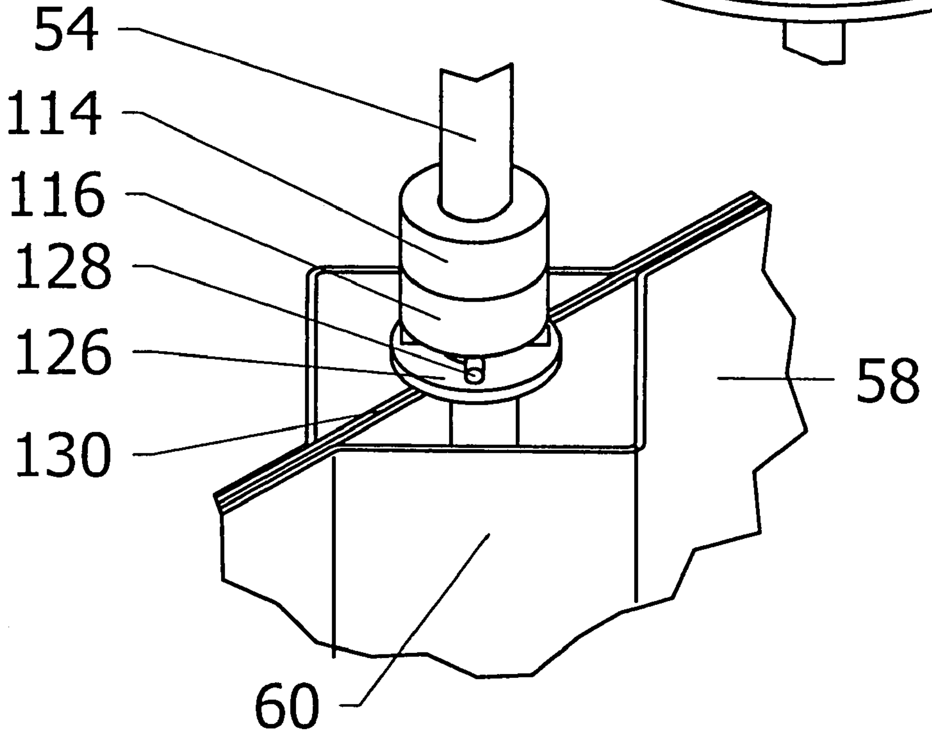
Figure 30

DISPENSING MACHINE TO STORE AND DISPENSE ELONGATED CONTAINERS VERTICALLY

BACKGROUND OF THE INVENTION

1. Field of the Invention

This invention relates to a dispensing machine for elongated containers of beverages and the like whereby said containers are stored vertically and automatically dispensed from said machine. More particularly, this invention relates to a dispensing machine having a plurality of vertical columns formed into clusters with one actuator for each cluster in which the clusters can be easily removed and replaced in the machine. The invention further relates to a method of constructing such a machine.

2. Description of the Prior Art

Applicant is the inventor named in U.S. Pat. No. 6,902,084 for a Container Dispenser. Usually, the containers contain beverages and the beverages are often what is commonly referred to as water, flavoured water, sports drinks or pure juices. The containers are often made from plastic and are weak laterally, but strong longitudinally. The beverages can be carbonated or non-carbonated. When non-carbonated beverages are used, the lack of carbonation results in the containers being more flexible laterally than containers with carbonated beverages.

The container dispenser has a plurality of tubes that are bound together into clusters of four tubes each. Generally, there are three clusters and therefore twelve tubes from front to rear of the dispensing machine. The clusters tilt forward for filling purposes. Since the tubes are made of plastic, there is very little capital cost in each cluster. When a cluster fails to work properly, it is desirable to remove that cluster and replace it with a new cluster rather than trying to repair the failed cluster on site. The failed cluster can then be returned to a repair site and repaired. The clusters described in the previous application cannot be easily separated from the remaining clusters and replaced without tools.

SUMMARY OF THE INVENTION

It is an object of the present invention to provide a dispensing machine whereby any number of clusters can be easily removed from the machine and replaced without tools. It is a further object of the present invention to provide an improved dispensing machine that is lightweight, inexpensive and durable and a machine in which the columns will not twist as the actuator rotates.

A dispensing machine for elongated containers having a neck at a top thereof comprises at least three vertical columns arranged adjacent to one another to form a cluster. The cluster has an interstice between the columns with an actuator mounted therein. The columns of each cluster are affixed to one another and the actuator has a lower platform and an upper platform. The columns have openings therein to receive the upper platform. Each platform is substantially perpendicular to the longitudinal axis of each column of the cluster. The platforms are mounted on a shaft with means to rotate said shaft by successive steps to eject one container from each machine for each step. The lower platform is located at a base of the cluster, the upper platform being located above the lower platform by a distance that is less than a height of one of the containers. The lower platform is larger than the upper platform, the containers being stored on top of one another in the columns in an upright position. The lower platform has a cutaway portion and is sized to block all of the columns except one in each position of the shaft. The upper platform is located at a level of the neck and is oriented to block one column that is not blocked by the lower platform in each position of the shaft. A first bracket extends between the columns near the base. The first bracket has an enlarged central portion that substantially fills the interstice. The shaft extends through the center portion, the first bracket having two ends extending outward from the center portion between the columns. The ends are removably affixed to a retainer, the retainer supporting the cluster including the actuator, and the retainer and first bracket preventing the columns from twisting as the actuator rotates.

Preferably, the vertical columns are tubes and, still more preferably, there are four tubes in each cluster.

A container dispensing machine as used for storing and dispensing containers longitudinally, where each container has a base and a top, the top being smaller than the base. A dispensing machine comprises a plurality of vertical guides arranged in at least one cluster, the vertical guides being sized so that a plurality of containers can fit within each of the guides longitudinally with the base being located beneath the top. Two platforms are rotatably mounted in a plane substantially normal to a longitudinal center axis of the at least one cluster. An actuator is connected to rotate the two platforms by part of one turn in the plane for each activation. Each of the two platforms has a cutaway portion, the two platforms being an upper platform and a lower platform. The platforms are oriented so that the cutaway portion of the upper platform is vertically offset from the cutaway portion of the lower platform by at least the distance that the two platforms rotate in one activation. The abutments rotate about a longitudinal axis that is substantially equidistant from each vertical guide. The upper platform is sized to rotate without damaging containers on the lower platform. The platforms are vertically separated by less than a height of one container. The vertical guides have an opening therein corresponding to a level of the upper platform to allow the upper platform to pass through the vertical guides. The dispensing machine has an outlet for any containers that pass the lower platform.

A method of constructing a dispensing machine for elongated containers having a neck at a top thereof uses a machine having at least three vertical columns arranged adjacent to one another to form a cluster with an interstice between the columns. An actuator is mounted within the interstice and has an upper platform and a lower platform that each extend beyond the interstice. A method comprises constructing the vertical columns and the actuator so that a weight of the cluster including the actuator is on a first bracket and removably mounting the first bracket on a retainer at a base of the cluster.

BRIEF DESCRIPTION OF THE DRAWINGS

FIG. 7 is a perspective view of a set of three clusters;

FIG. 8 is a rear view of the set of three clusters;

FIG. 9 is side view of the set of three clusters;

FIG. 15 is a perspective view of the rear bracket;

FIG. 16 is a top view of the rear bracket;

FIG. 19 is a side view of a side view of a front plate;

FIG. 20 is a perspective view of the front plate;

FIG. 29 is a partial perspective view of an actuator and cam;

FIG. 30 is a partial perspective view of the actuator and shaft and first bracket;

DESCRIPTION OF A PREFERRED EMBODIMENT

Figure 1:
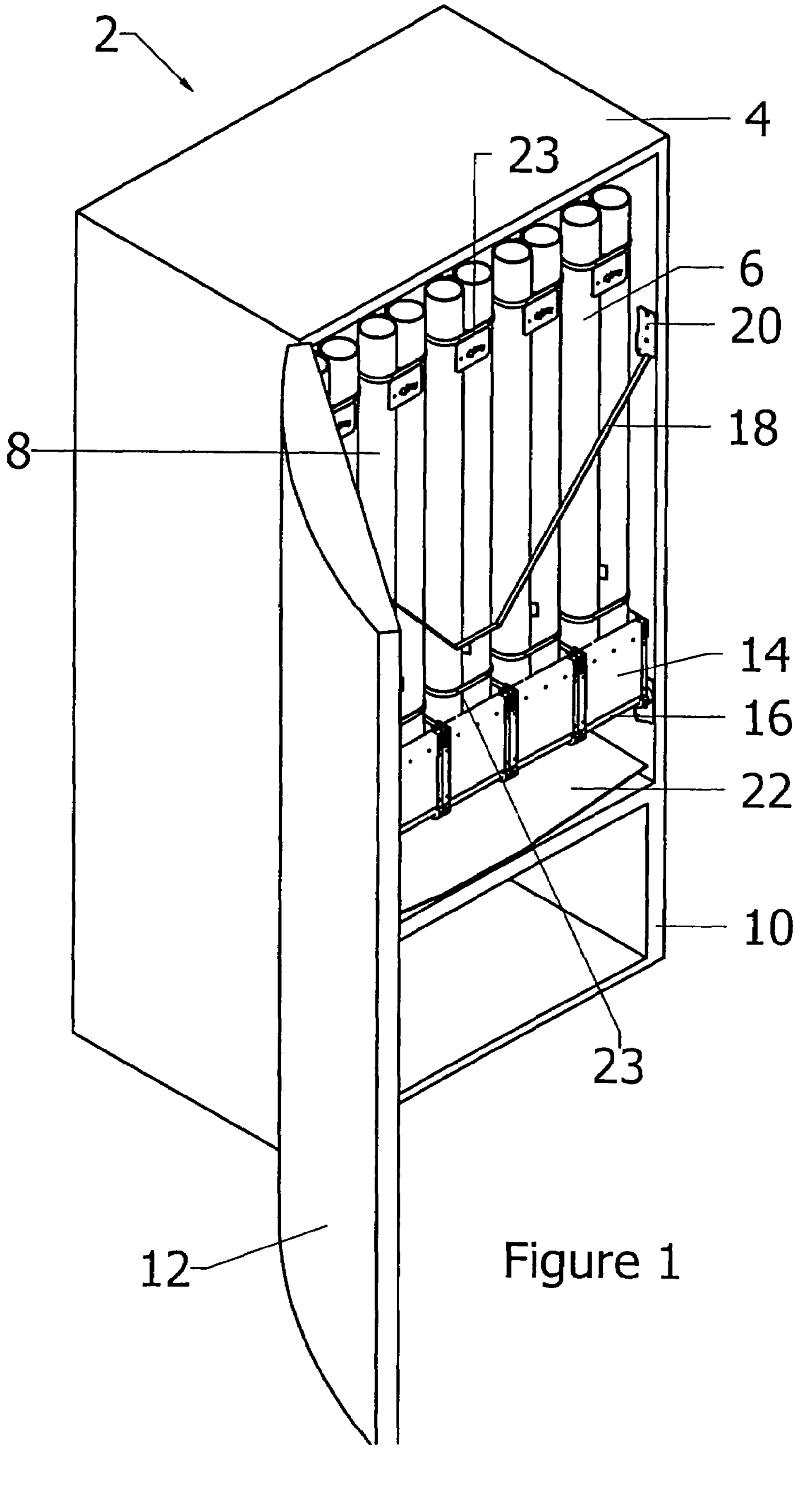
FIG. 1 is a perspective view of a dispensing machine having a door in an open position.

In FIG. 1, there is shown a dispensing machine 2 having a housing 4 containing fifteen clusters 6 of tubes 8 only five of the clusters 6 being partially shown. The housing 4 has a front 10 and a door 12 that is in an open position. The refrigeration equipment, or temperature control equipment and the wiring of the dispensing machine are considered to be conventional and are not described unless expressly stated. Each set of three clusters has a front plate 14 with a pivot bar 16 extending across the front 10 of the housing 4. A strap 18 is releasably attached to an inside wall mount 20. The strap 18 holds the clusters in position so that they will not tilt forward. A chute 22 provides an exit through an outlet in the door (not shown) for any containers that exit from the clusters 6. The clusters 6 are bound together at top and bottom by bindings 23.

Figure 2:
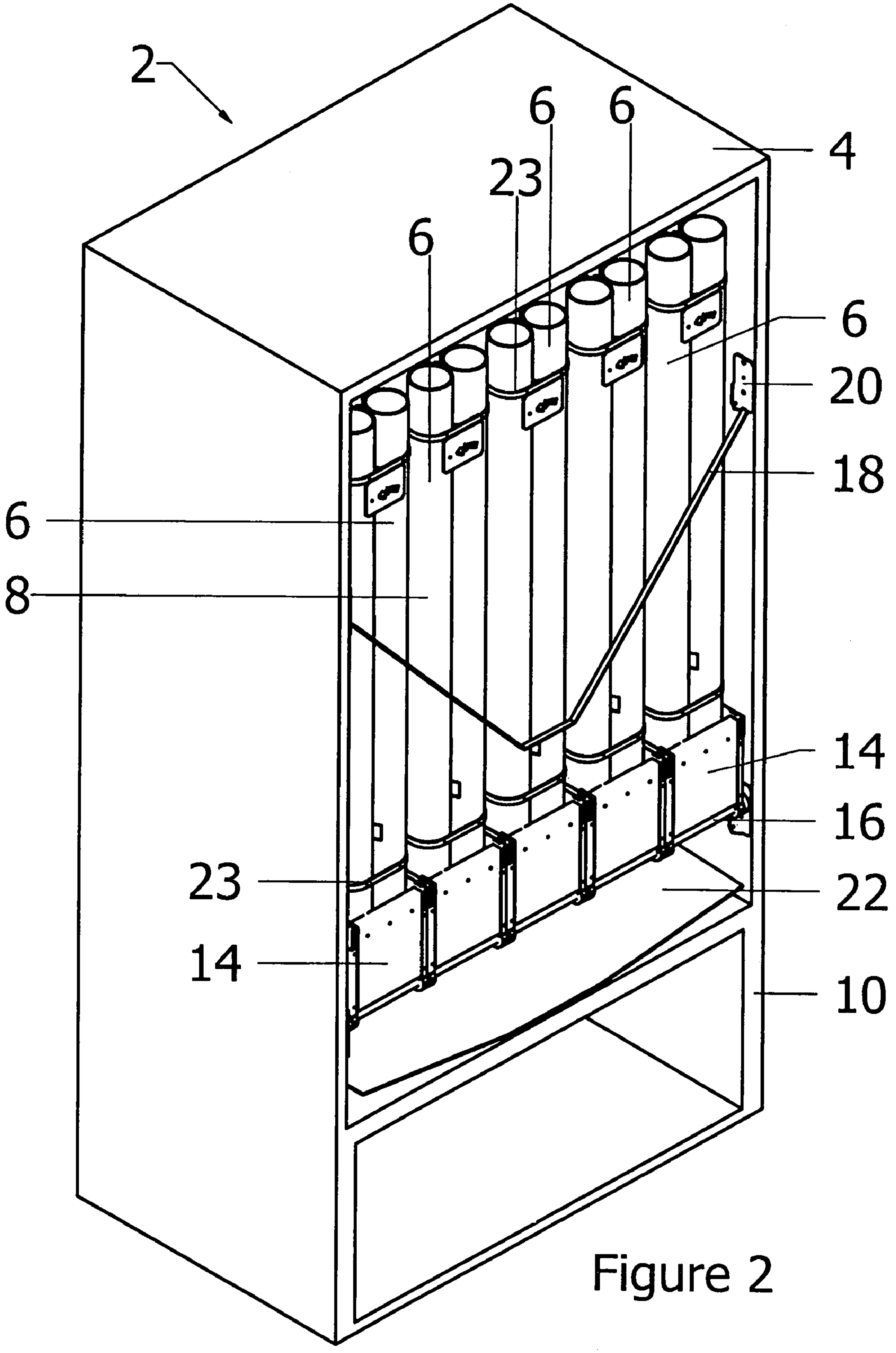
FIG. 2 is a perspective view of the dispensing machine with the door removed.
Figure 3:
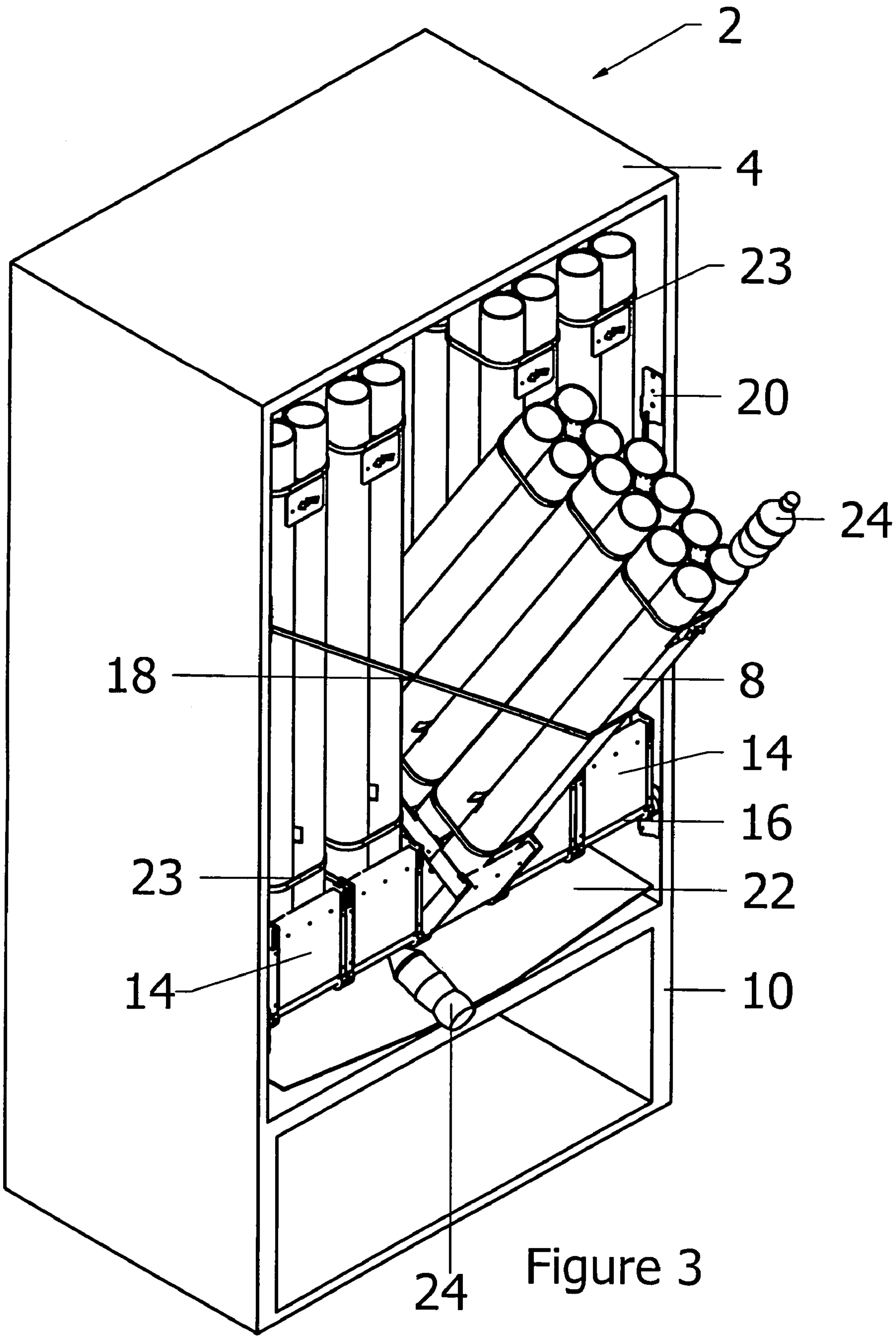
FIG. 3 is a perspective view of a dispensing machine with the door removed and a central group of clusters tilted forward for filling purposes.
Figure 4:
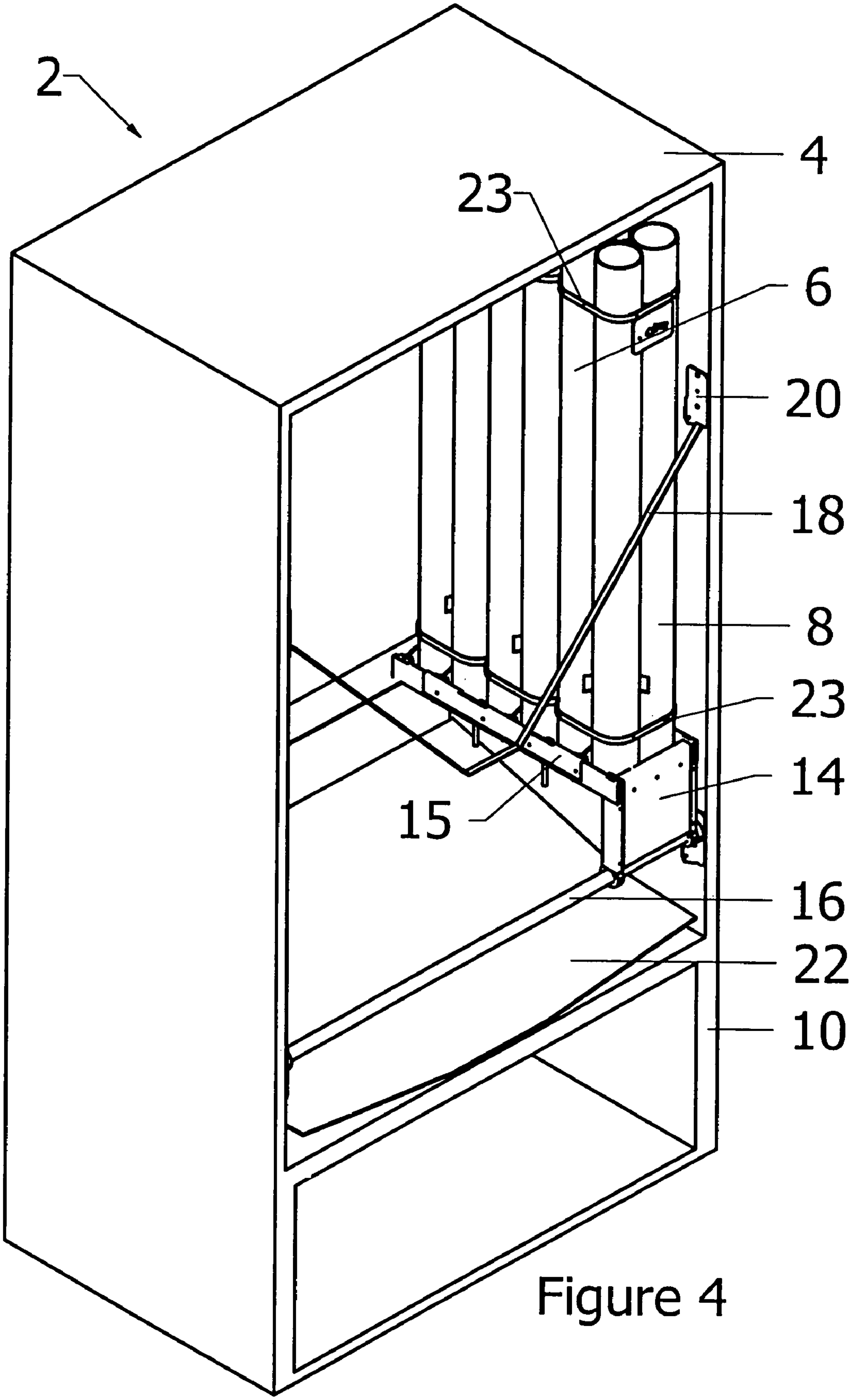
FIG. 4 is a perspective view of a dispensing machine without a door where the machine contains one group of three clusters.

In FIGS. 2, 3 and 4, the same reference numerals are used to describe those components that are identical to the components of FIG. 1. In FIG. 2, the removal of the door provides better visual access to an interior of the machine 2. In FIG. 3, one set of three clusters is tilted forward to allow the clusters to be filled with containers. On the chute 22, there is a container 24 that is about to exit from the machine 2. It can be seen that another container 24 is about to be placed into a top of one of the tubes 8. It can be seen that the strap 18 is flexible and bends outward as the central group is tilted to the position shown in FIG. 3. In FIG. 4, only one set of three clusters is located in the machine 2 to provide an improved view of an interior of the housing 4. The front plate 14 is mounted on a retainer 15.

Figure 5:
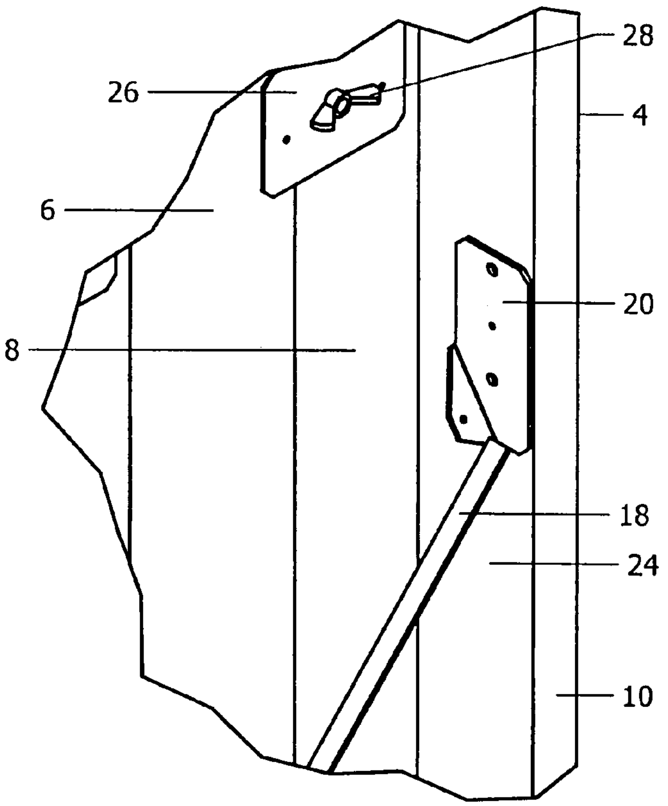
FIG. 5 is a partial perspective view of a connection between a strap and a sidewall.

In FIG. 5, it can be seen that the strap 18 is releasably connected into a side plate 20 mounted on an inside wall 24 of the housing 4. There is also shown an enlarged view of a front top plate 26 which is mounted at a top of the cluster 6 and has a wing nut 28 thereon. The wing nut is connected to a top bracket (not shown in FIG. 5).

Figure 6:
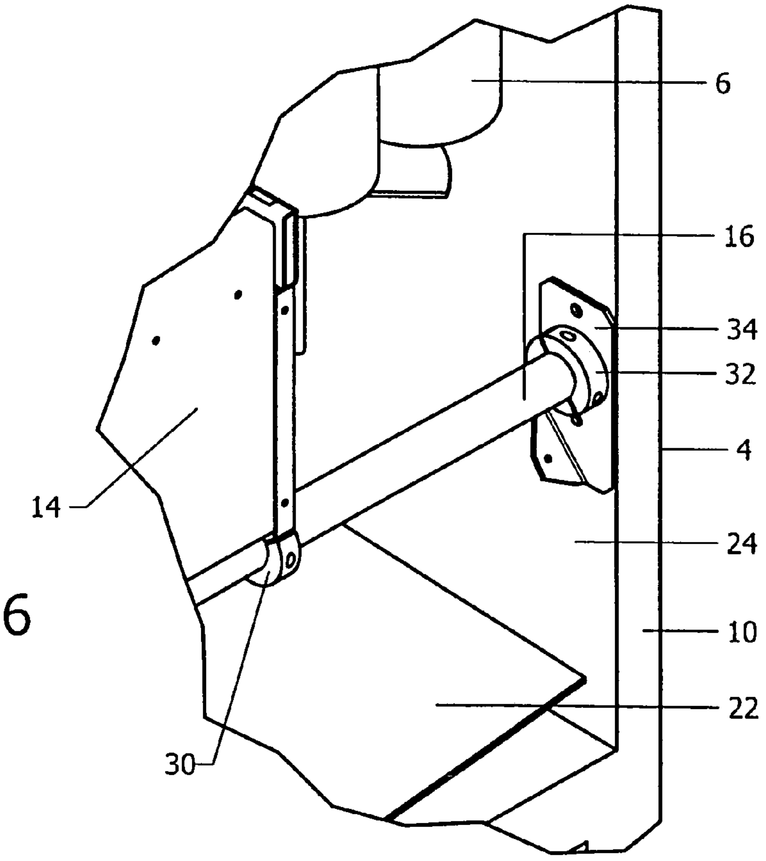
FIG. 6 is a partial perspective view of a pivot bar connected to a sidewall.

In FIG. 6, the front plate 14 on the cluster 6 on the right hand side has been removed to reveal the pivot bar 16, which extends through split shaft collars 30, 32. The split shaft collar 32 is connected to a wall bracket 34. The same reference numerals are used in FIGS. 5 and 6 as those used in FIGS. 1 to 4 for those components that are identical. The split shaft collar 32 is split in half to allow the pivot bar 16 to be inserted laterally.

In FIGS. 7, 8 and 9, there is shown a perspective view, a rear view and a side view of a set 35 of three clusters 6 mounted in the retainer 15. The same reference numerals are used in FIGS. 7, 8 and 9 as those used in FIGS. 1 to 6 for those components that are identical. It can be seen that each cluster consists of four tubes 8 and each cluster is held together at the top and bottom by the bindings 23. It can be seen that the four tubes 8 of each cluster 6 have an interstice 36 along a longitudinal center axis of each cluster. There is a rear top plate 37 mounted at a back of the rear cluster 6. The rear top plate 37 is connected into the top bracket (not shown in FIGS. 7, 8 and 9). Both the rear top plate 37 and the front top plate 26 are held in place by the bindings 23. A bottom rear plate 38 is held in place by the binding 23 and is located at the rear of the third cluster 6. It can be seen that the tubes 8 in the rear cluster 6 are shorter than the tubes 8 in the front cluster 6 and the center cluster 6. The tubes are shorter in the rear cluster so that the three clusters can be tilted forward about a pivot axis through the split shaft collars 30. The split shaft collars 30 are connected to the retainer 15 by U-shaped side plates 40.

Figure 10:
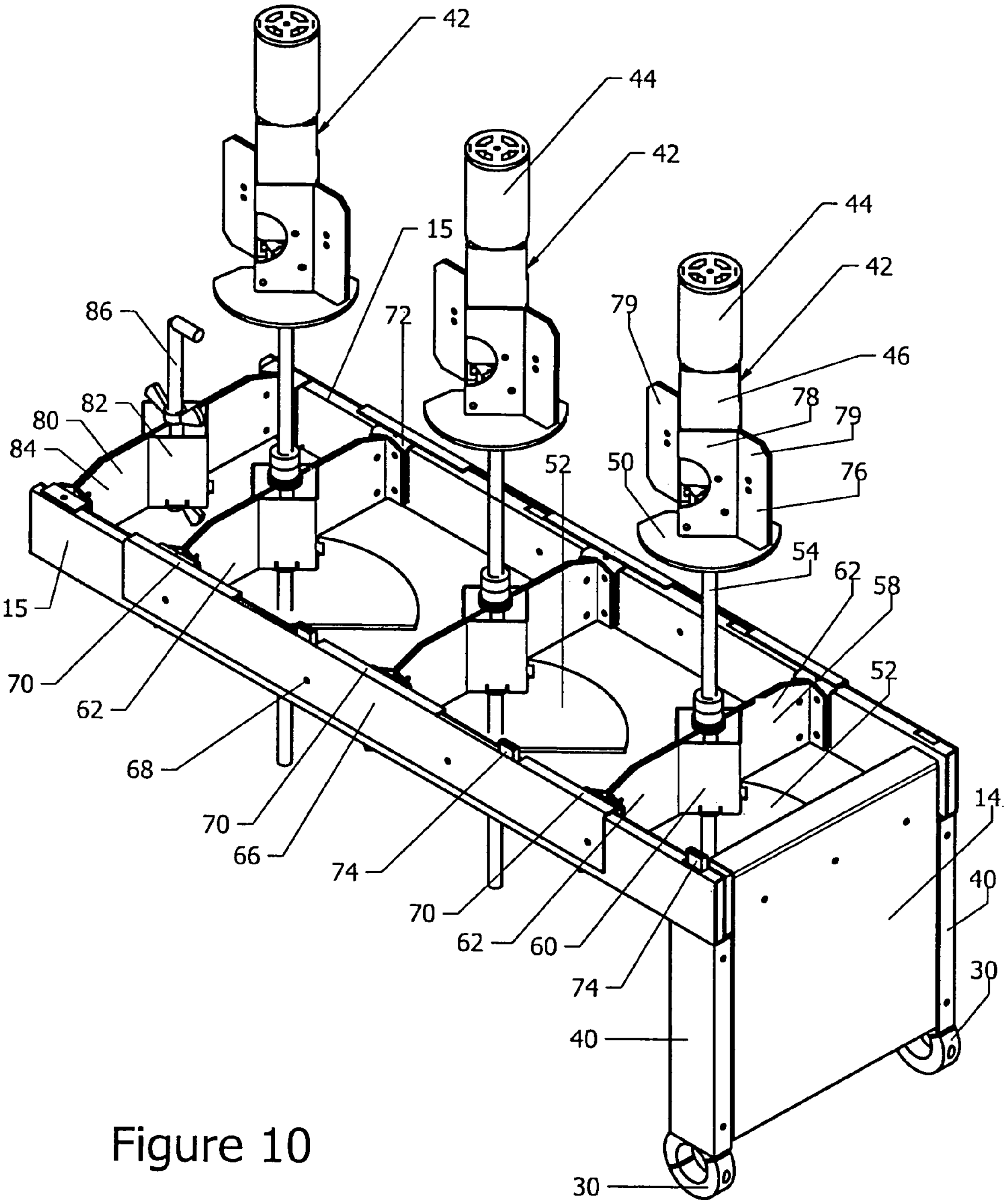
FIG. 10 is a partial perspective view of the three clusters with first brackets mounted in a retainer and tubes deleted to expose actuators.

In FIG. 10, there is shown a perspective view of the retainer 15 with the tubes deleted to expose actuators 42. There is one actuator 42 for each cluster and the actuators are sized and shaped to be mounted within the interstice (not shown in FIG. 10). Each actuator 42 has a motor 44, a gear box 46, an upper platform 50 and a lower platform 52 all mounted in a shaft 54 is mounted to rotate about its longitudinal axis and the upper platform 50 extends into suitable openings within the tubes 8 (not shown in FIG. 10). The same reference numerals are used in FIG. 10 as those used in FIGS. 1 to 9 for those components that are identical. A first bracket 58 has an enlarged central portion 60 that has a square cross section and is sized to fit within the interstice. The bracket 58 has two ends 62 that extend between the tubes 8 (not shown in FIG. 10) and are affixed to the inside wall of the retainer 15. The retainer 15 has an outer plate 66 affixed thereto by rivets 68. The outer plate 66 has flanges 70 that extend inward over a top of the retainer 15. The flanges 70 are spaced above the top of the retainer 15 to allow end brackets 72 on the ends 62 to slide beneath the flanges 70. Connectors 74 are connected to each of the motors 44 to enable the motors to be powered by an electrical power source (not shown) plugged into the connectors. There is one connector for each cluster. The split shaft collars 30 are split to allow the pivot bar (not shown in FIG. 10) to be inserted laterally into the split shaft collars.

An upper bracket 76 is located above the upper platform 50 and has an enlarged central portion 78 that is sized and shaped to fit snugly within the interstice (not shown in FIG. 10). The central portion 78 has a square cross section and the bracket has ends 79 extending outward therefrom between the tubes 8 (not shown in FIG. 10). The entire weight of each cluster rests upon the first bracket 58 and therefore the retainer 15. Both the first bracket 58 and the upper bracket 76 prevent the tubes (which are preferably made of plastic) from twisting as the actuator 42 rotates. A rear bracket 80 has an enlarged central portion 82 and ends 84 extending outward therefore. An L-shaped rod 86 extends upward from the central portion 82. The rear bracket extends between the sides of the retainer 15 and anchors the rear cluster so that it will not fall out of the retainer 15 when the three clusters are tilted forward.

Figure 11:
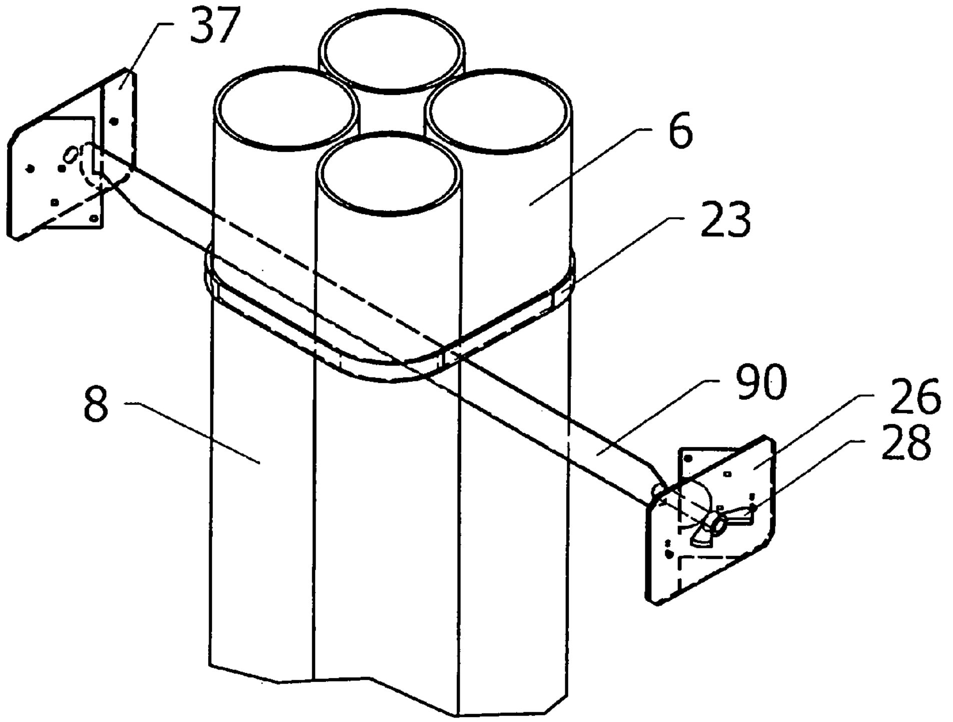
FIG. 11 is schematic partial perspective view of a top bracket extending through a cluster.

In FIG. 11, there is shown a partial perspective view of the center cluster 6 from FIGS. 7, 8 and 9 with the top bracket 90 extending from front to rear between the tubes 8 and between the front top plate 26 and the rear top plate 37. The top bracket 90 extends between the tubes of all three clusters that are mounted on the same retainer 15. The top bracket 90 extends through the front top plate 26. The wing nut 28 is screwed onto the top bracket 90 on the outer side of the upper front top plate 26 and is tightened to draw the three clusters together. The top bracket 90 extends above the binding 23.

Figure 12:
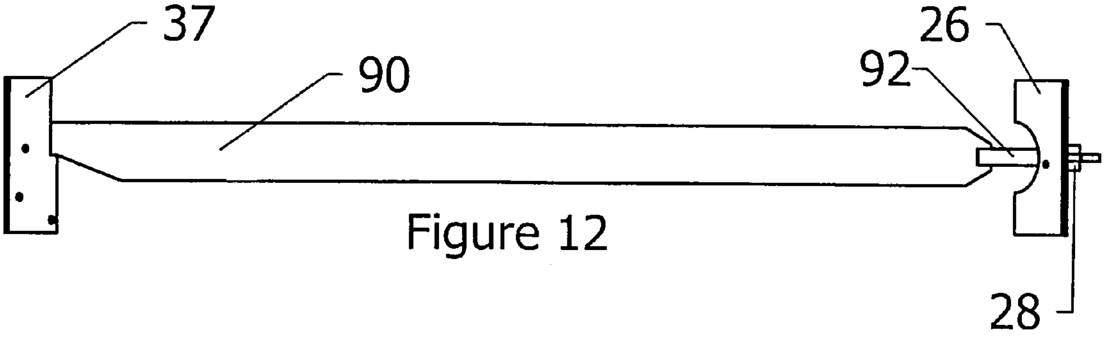
FIG. 12 is a side view of the top bracket.

In FIG. 12, there is shown a side view of the top bracket 90. The same reference numerals are used in FIG. 12 as those used in FIG. 11 to describe those components that are identical. It can be seen that the top bracket has a cylindrical projection 92 that extends through the upper front plate 26.

Figure 13:
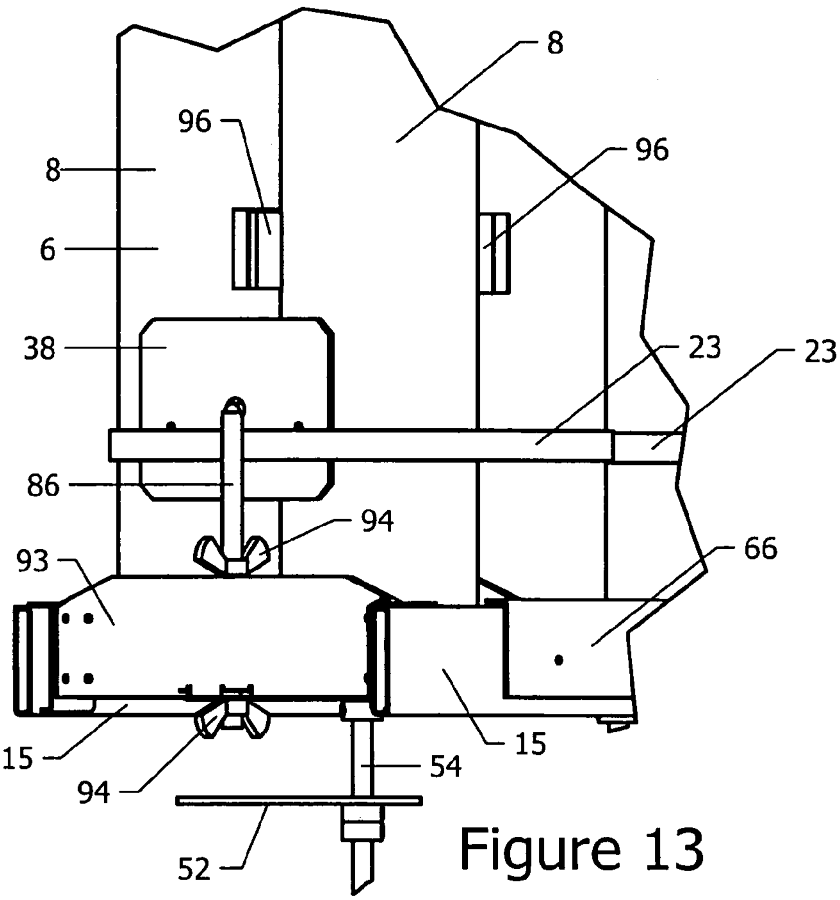
FIG. 13 is a partial perspective view of a rear bracket.

In FIG. 13 there is shown a partial rear perspective view of the rear cluster 6 from FIGS. 7, 8 and 9 and a rear bracket 93. The same reference numerals are used in FIG. 13 as those used in FIGS. 7 to 10. It can be seen that the rod 86 extends into an opening in the bottom rear plate 38. Wing nuts 94 allow the rod 86 to be adjusted upward or downward so that it is at the proper height to fit within the opening of the bottom rear plate 38. Openings 96 are located in the tubes 8 to receive the upper platform (not shown in FIG. 13). It should be noted that the rear bracket 93 is missing the square central portion 82 shown in FIGS. 10 and 14 as the bracket 93 has a flat outer surface compared to the bracket 80 shown in FIGS. 10 and 14.

Figure 14:
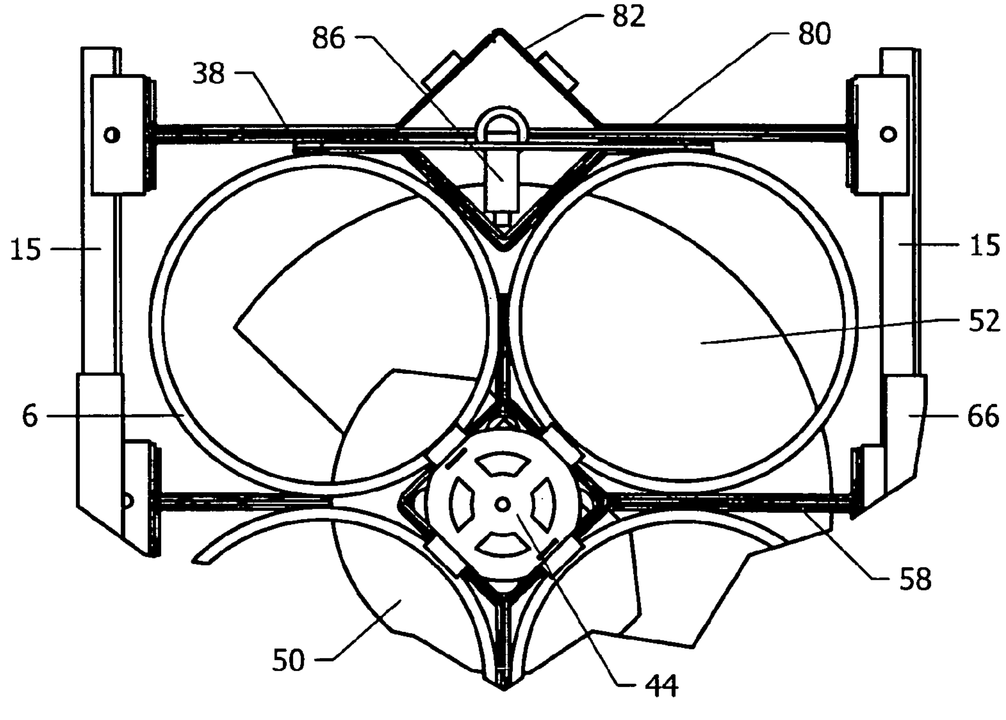
FIG. 14 is a partial top view of a cluster and the rear bracket.

In FIG. 14, there is shown a partial top view of the rear cluster shown in FIG. 13 except that the rear bracket 80 is a variation of the rear bracket 93 shown in FIG. 13. The rear bracket 93 has an enlarged central portion (not shown in FIG. 13) extending inward but not outward. The same reference numerals are used in FIG. 14 as those used in FIGS. 10 and 13 to describe those components that are identical.

In FIGS. 15 and 16, there is shown a perspective view and top view respectively of the rear bracket 80. The same reference numerals are used in FIGS. 15 and 16 as those used in FIGS. 10, 13 and 14 for those components that are identical. U-shaped end brackets 97 are affixed to each end 84 of the rear bracket 80. It can be seen that the end brackets 97 have openings therein to affix the rear brackets 80 to the inside of the retainer 15 (not shown in FIGS. 15 and 16).

Figure 17:
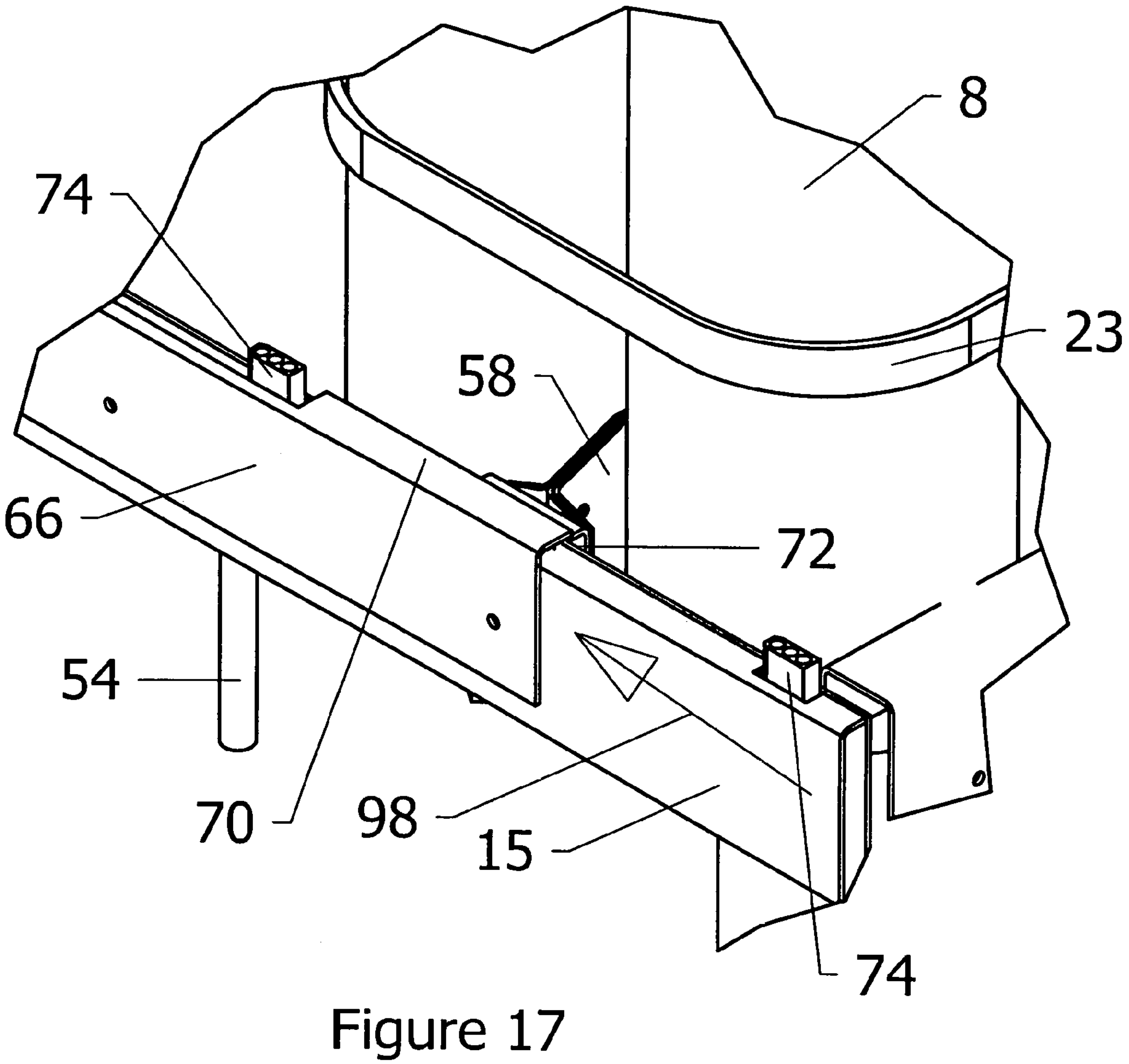
FIG. 17 is a partial perspective view of a cluster and retainer.

In FIG. 17, the same reference numerals are used as those used in FIGS. 10, 13 and 14 to describe those components that are identical. FIG. 17 is a partial perspective view of a lower front portion of the first cluster 6 shown in FIGS. 7, 8 and 9. The front plate 14 has been removed and an arrow 98 shows that the clusters 6 can be placed into the retainer 15 by orienting them at the front of the retainer and sliding the end brackets 72 beneath the flange 70. When the clusters 6 are removed or replaced in the retainer 15, the front plate 14 is removed and the three clusters can then be slid into position in succession or slid out the front of the retainer, as desired.

Figure 18:
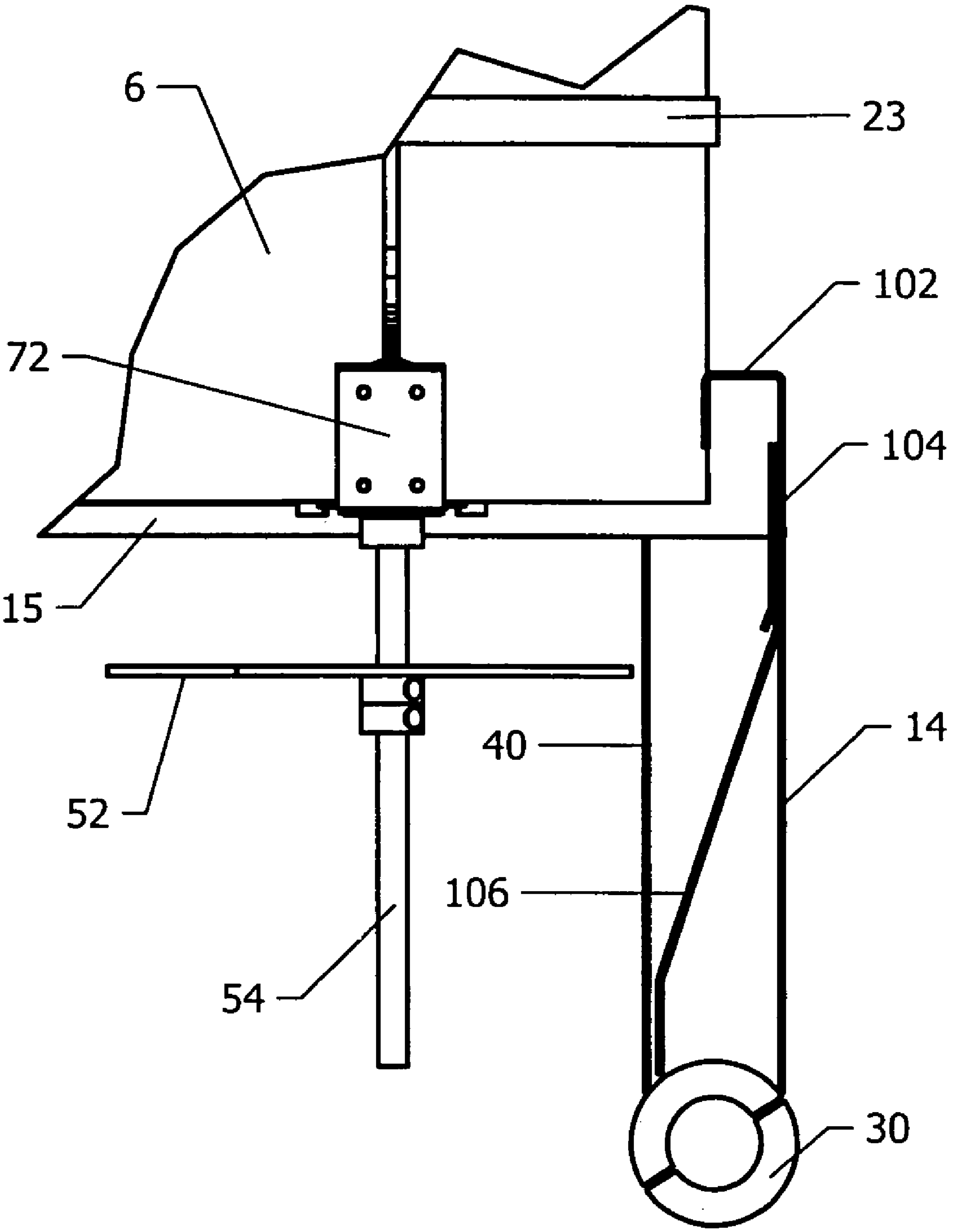
FIG. 18 is a partial side view of a cluster and front plate.
Figure 21:
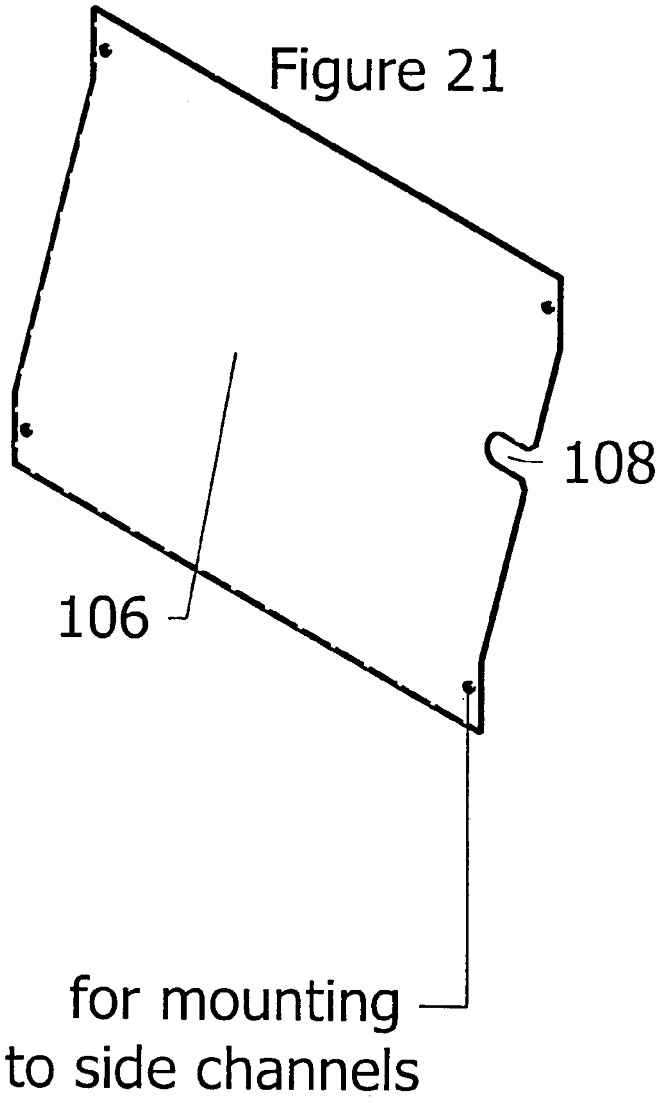
FIG. 21 is a perspective view of a sloped plate.
Figure 22:
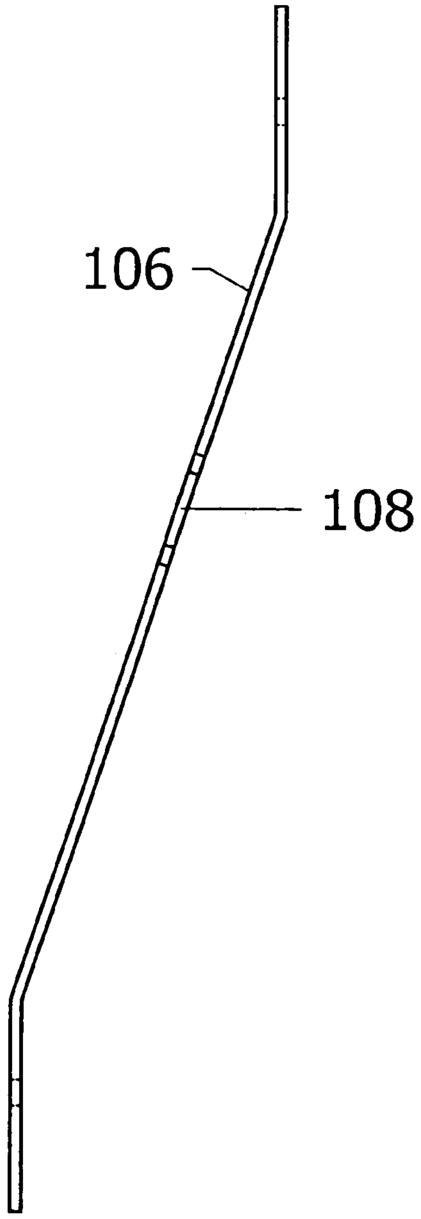
FIG. 22 is an edge view of the sloped plate.
Figure 23:
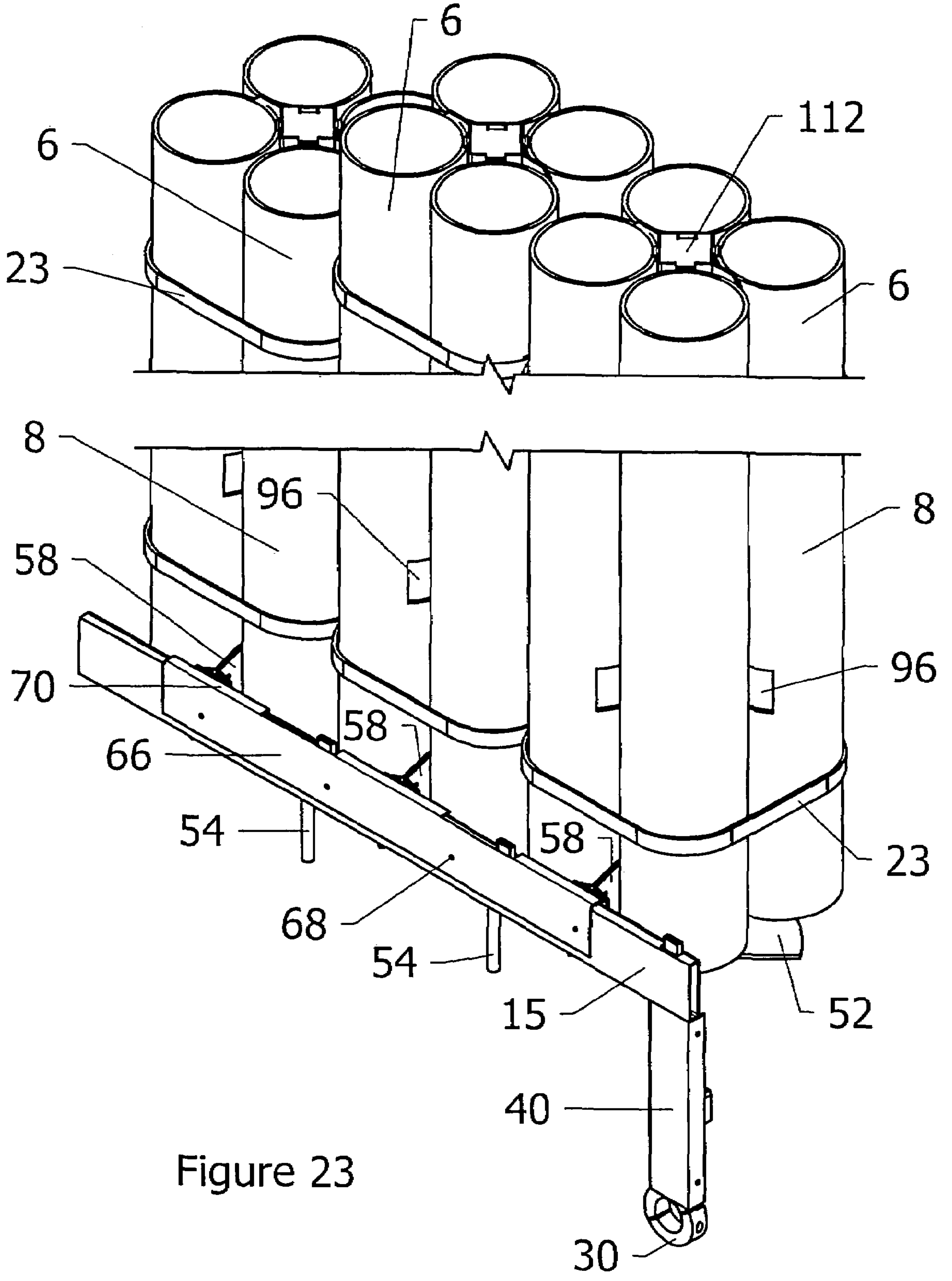
FIG. 23 is a partial perspective view of three clusters in a retainer.

In FIGS. 18 to 23, the same reference numerals are used as those used in FIGS. 1 to 17 to describe those components that are identical. FIG. 18 shows a schematic side view of the front plate 14. As shown in FIGS. 18, 19 and 20, the front plate 14 has a U-shaped flange 102 at a top thereof with a clip 104 affixed to an inside of the front plate 14. In FIGS. 21 and 22, there is shown a perspective view and an edge view of a sloped plate 106. A notch 108 in a side of the sloped plate 106 allows electrical wiring (not shown) to pass through the plate 106. The front plate 14, upper flange 102, clip 104 and sloped plate 106 are shown in FIG. 18. The sloped plate 106 has a lower end that is riveted or screwed to a U-shaped inner wall of the U-shaped side plates 40. This allows the front plate 14 to be set in place when the clusters have all been inserted into the retainer 15. The clip 104 of the front plate 14 fits onto an upper end of the sloped plate 106. The front plate 14 can simply be lifted upward to remove the front plate 14 from the upper end of the sloped plate 106. When the front plate 14 is removed, the clusters can be removed or replaced from or into the retainer 15. The sloped plate 106 ensures that no containers exiting the first cluster 6 of the three clusters shown in FIGS. 7, 8 and 9 become wedged on the pivot bar 16 (not shown in FIG. 18). In FIG. 23, there is a spacer 112 located in the interstice of each cluster 6. The spacer 112 maintains the top of the four tubes 8 of each cluster 6 in a square configuration.

If a cluster is not working properly, rather than attempt to repair the cluster on site, the person who is responsible for refilling the dispensing machine can simply remove the failed cluster and replace it with a cluster that is operating properly. The failed cluster can then be returned to a repair center where it can either be repaired or discarded.

Figure 24:
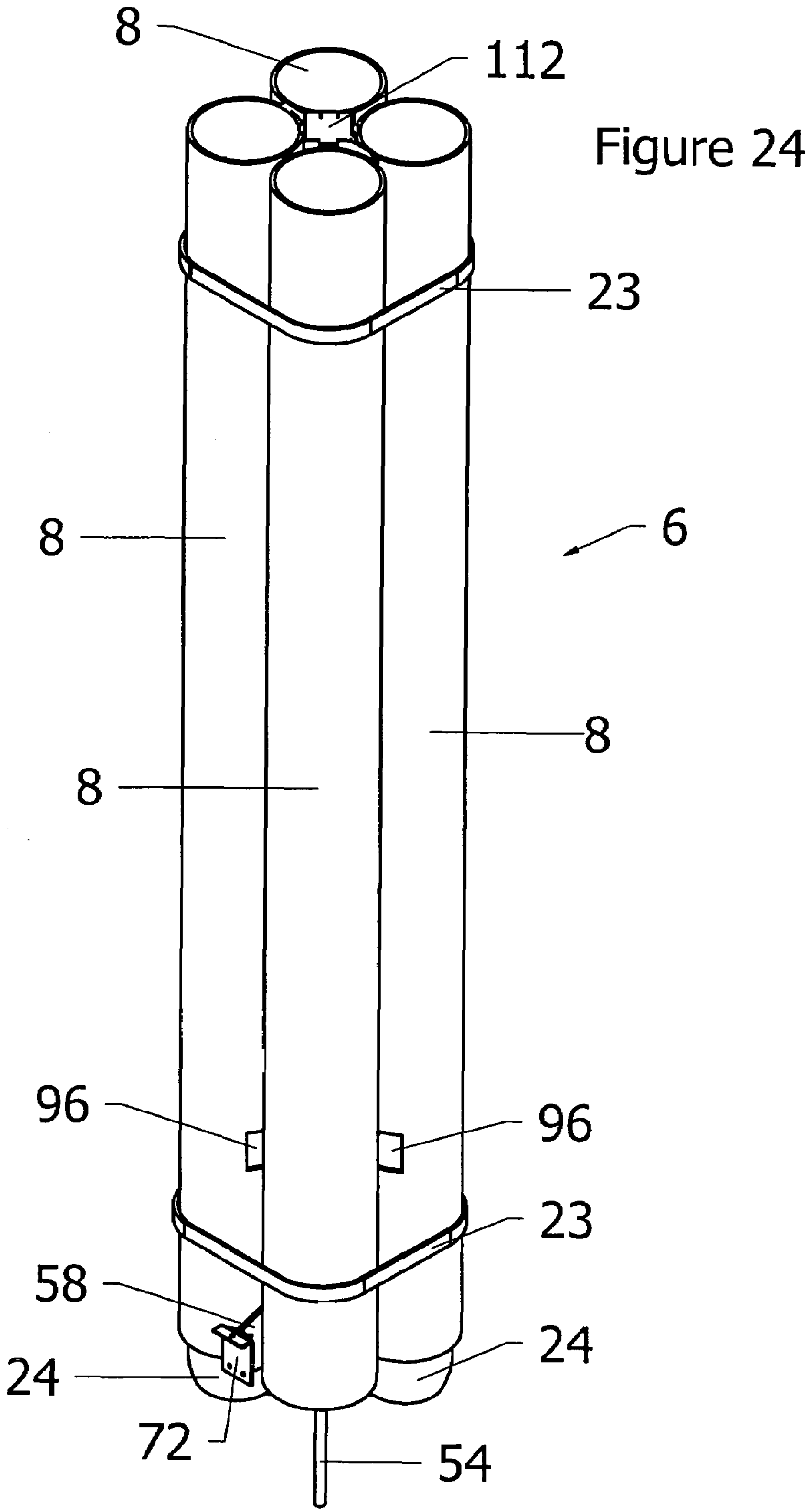
FIG. 24 is a partial perspective view of a cluster having containers therein.
Figure 25:
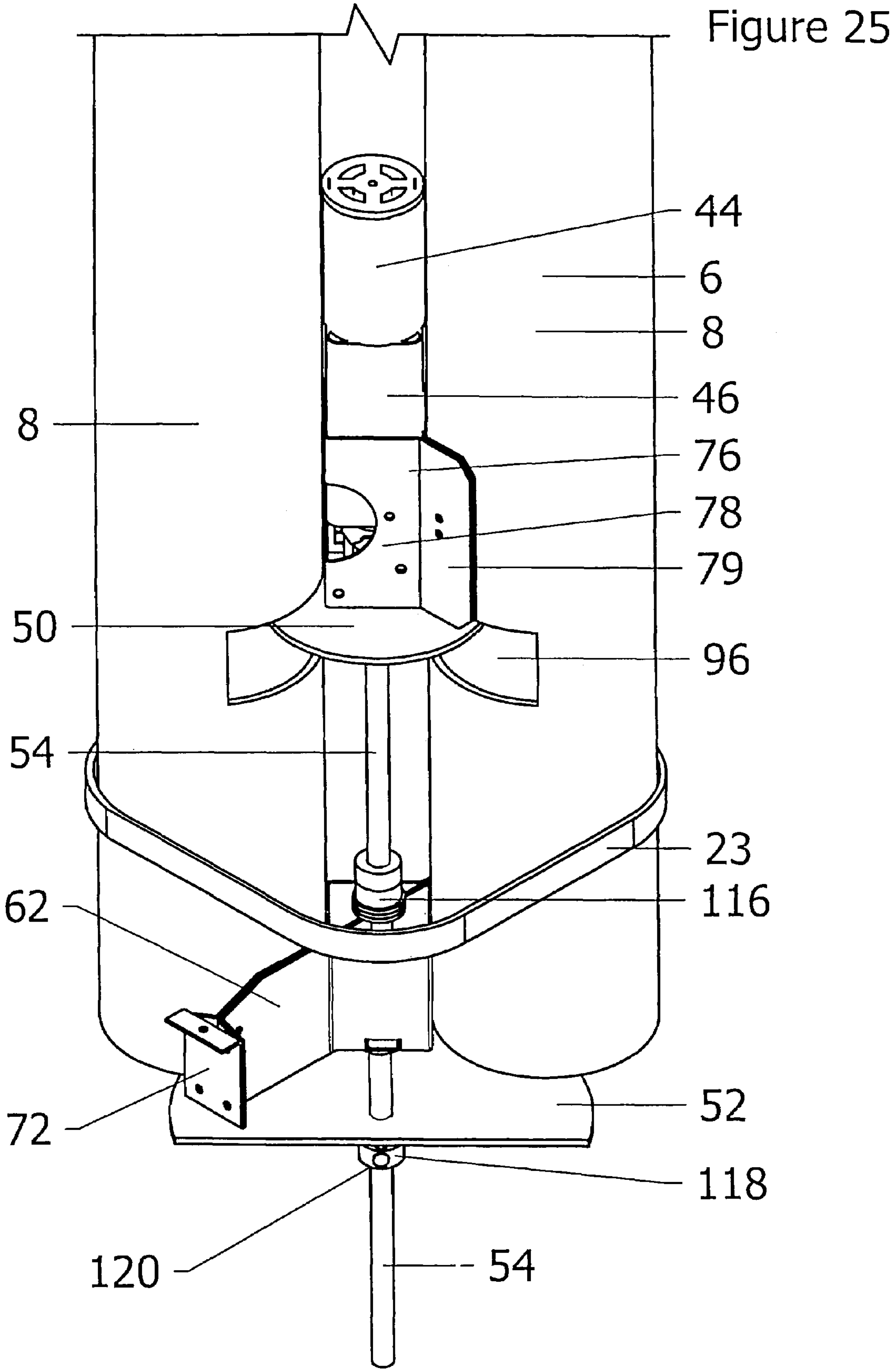
FIG. 25 is a partial perspective view of a cluster with a front tube removed.

In FIG. 24, there is shown a perspective view of the cluster 6 and, in FIG. 25, there is shown an enlarged partial perspective view of a cluster 6 with one tube removed to partially expose the actuator 42. Within the enlarged central portion 78 of the upper bracket 76, there is mounted a micro switch (not shown) to control the movement of the motor 44 and shaft 54 for each activation. In the four tube arrangement shown in the drawings, the motor causes the shaft to rotate through 90 degrees for each activation. There are various other ways, which will be readily apparent to those skilled in the art, to cause the motor to move ¼ turn with each activation. The same reference numerals are used in FIGS. 24 and 25 as those used in FIGS. 1 to 23 for those components that are identical.

Figure 26:
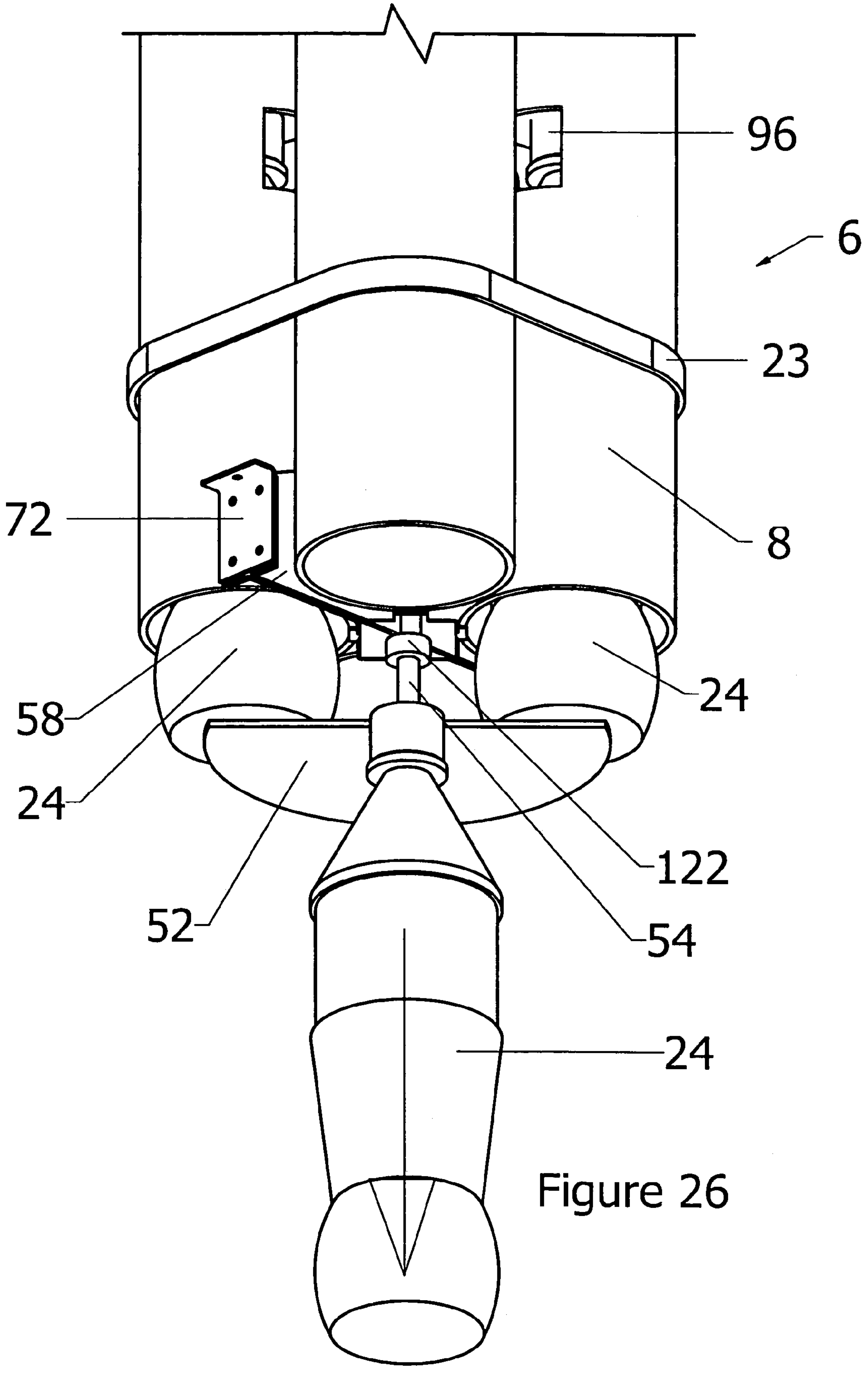
FIG. 26 is a partial perspective view of a cluster viewed from a bottom with a container being ejected.

In FIG. 26, there is shown a perspective view of a bottom portion of the cluster 6 with containers in the tubes 8. There are four tubes 8 in the cluster 6 but the rear tube is not shown. It can be seen that there are containers 24 resting on the platform 52 for the two side tubes 8. The rear tube (not shown in FIG. 26) will also have a container 24 (not shown) resting on the lower platform 52. One container 24 from the front tube 8 is falling past the lower platform 52 and is the one container that is being ejected from the cluster for the position of the actuator shown. The front tube 8 will have another container 24 that is resting on the upper platform 50 (not shown in FIG. 26) for that position of the actuator. The shaft 54 has a collar 122 affixed thereto just beneath the bracket 58. Preferably, all four tubes will be filled with containers to the greatest extent possible with the containers being mounted on top of one another. The same reference numerals are used in FIG. 26 as those used in FIGS. 1 to 25 for those components that are identical.

Figure 27:
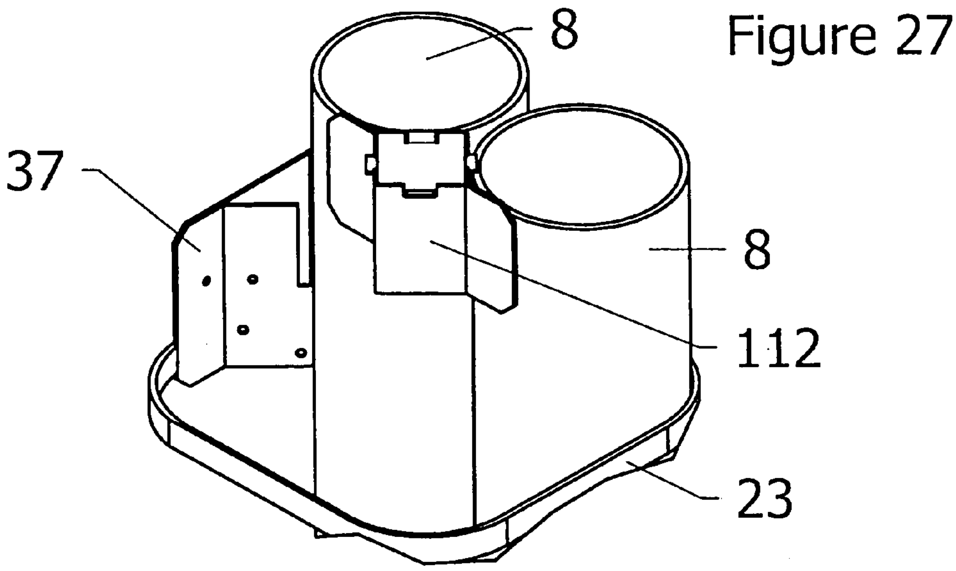
FIG. 27 is a partial perspective view of a top of a cluster with a top bracket and two tubes removed.

In FIG. 27, there is shown a perspective view of an upper portion of the cluster 6 with two tubes removed to expose the spacer 112 which is located at the top of the tubes 8. The top rear plate 37 is also shown in FIG. 27 as is the binding 23.

Figure 28:
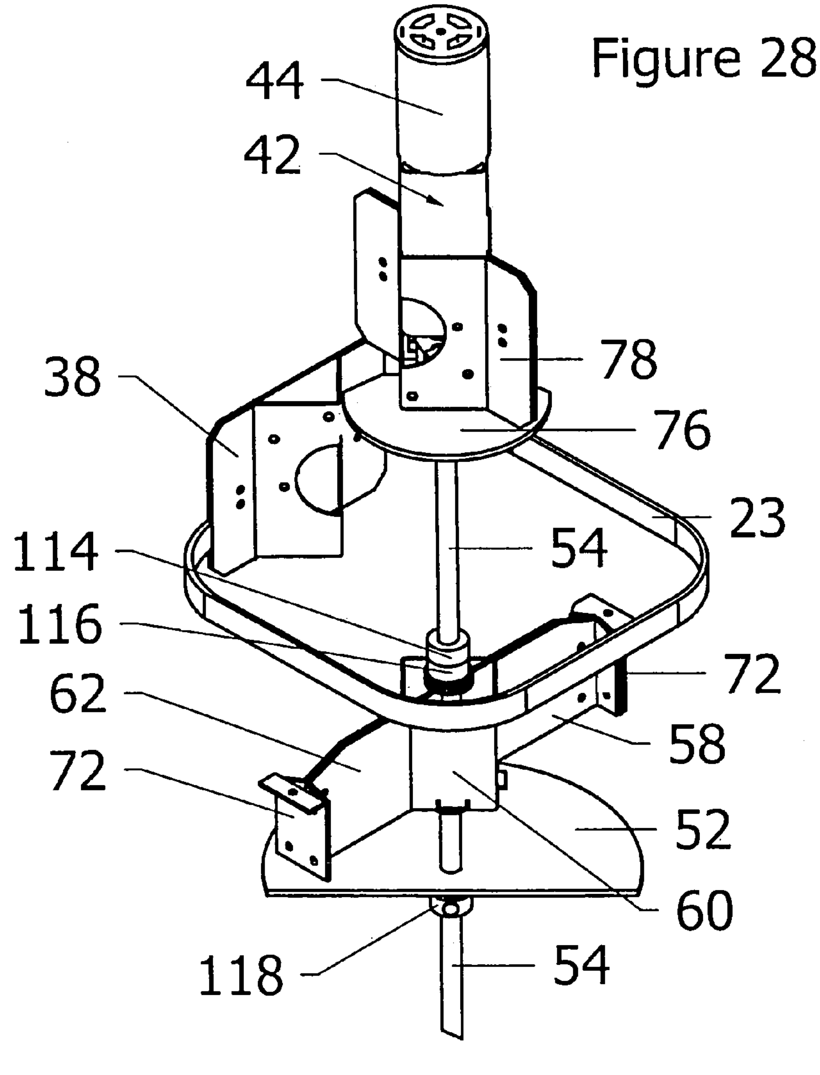
FIG. 28 is a partial perspective view of an actuator and brackets with the tubes removed.

In FIG. 28, there is shown a perspective view of a cluster with all of the tubes removed to expose the actuator 42, the upper bracket 76, the bottom rear plate 38, the first bracket 58 and the binding 23. The same reference numerals are used in FIG. 28 to describe those components that are identical to the components shown in FIGS. 7 to 10.

In FIG. 29, there is shown a perspective view of part of an actuator 42 with a cam 124 mounted on the shaft 54 beneath the gear box 46. The cam has four points (only two of which are shown in FIG. 29) located 90 degrees apart from one another. As the shaft rotates, these four points contact a micro switch (not shown) to stop the motor and therefore the rotation of the shaft after 90 degrees of movement. The cam is located above the upper platform 50.

In FIG. 30, there is shown a partial perspective view of that part of the actuator that is located within and immediately above the first bracket 58. The shaft 54 has a first shaft collar 114 mounted thereon and a second shaft collar 116 mounted thereon immediately beneath the first shaft collar 114. There are two washers concentrically mounted on the shaft 54 immediately beneath the second shaft collar 116, but these two washers have been deleted to expose a roller thrust bearing 126 having rollers 128 spaced apart from one another thereon. The first shaft collar and the second shaft collar each have set screws therein that are not shown. The roller thrust bearing 126 rests upon a wall 130 of the first bracket 58 that extends diagonally through the central portion 60 of the first bracket 58. The wall 130 has a gap therein (not shown) around the shaft 54. When the shaft 54 rotates, the diagonal wall 130 supports the roller thrust bearing 126, which in turn supports the washers (not shown) and the first and second shaft collars 114, 116 as well as the rest of the actuator 42, the tubes (not shown) and the rest of the cluster. In other words, the diagonal wall 130 and the roller thrust bearing 126 support the entire weight of the cluster within the retainer (not shown in FIG. 30). Each cluster is light in weight because the tubes are preferably made from plastic, the brackets and spacers are preferably made from galvanized metal sheets and the actuator components are quite small and therefore light in weight.

Figure 31:
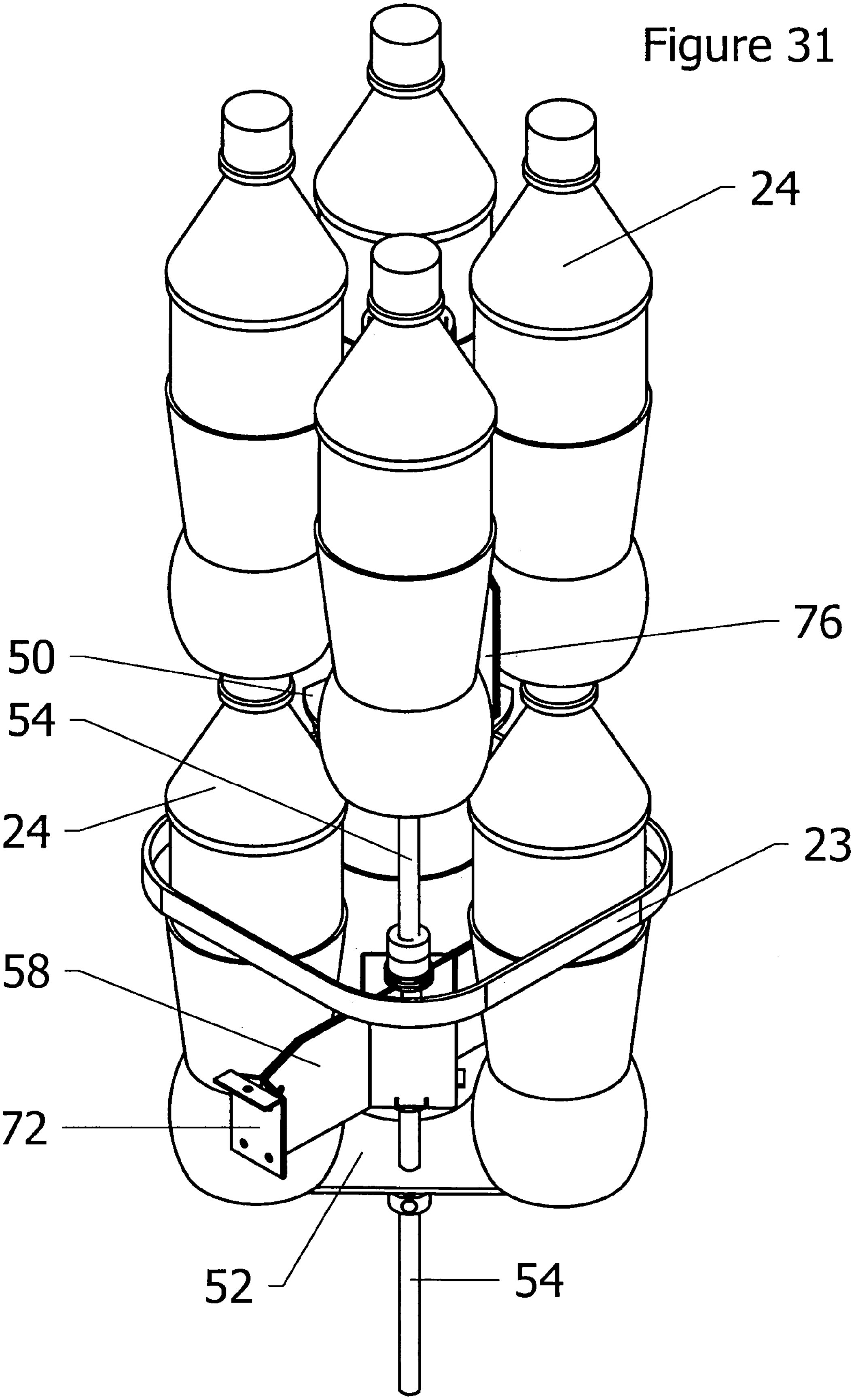
FIG. 31 is a schematic partial perspective view of containers mounted in a cluster with the tubes removed.

In FIG. 31, there is shown a perspective view of a lower portion of a cluster with the tubes removed to expose the containers. The actuator in FIG. 31 is in the same position as the actuator in FIG. 26. It can be seen that there are three containers 24 on the lower platform 52 and one container 24 at the front on the upper platform 50. The containers 24 at the two sides and rear of the upper level are resting upon the container located immediately beneath each of those three containers. The same reference numerals are used in FIG. 31 and those used in FIGS. 10 and 26 for those components that are identical.

Figure 32:
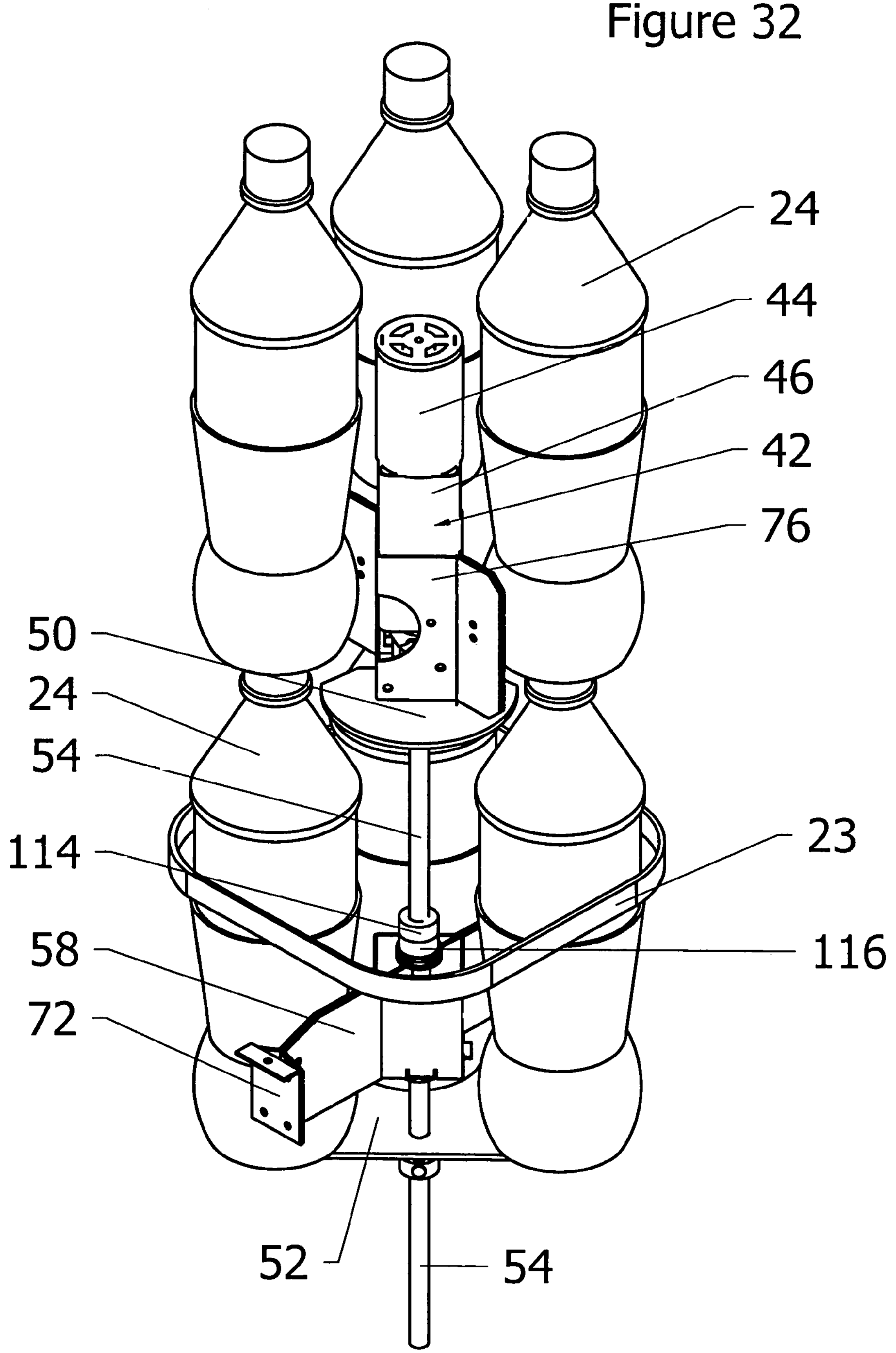
FIG. 32 is a partial schematic perspective view of a cluster with six containers and the tubes removed.
Figure 33:
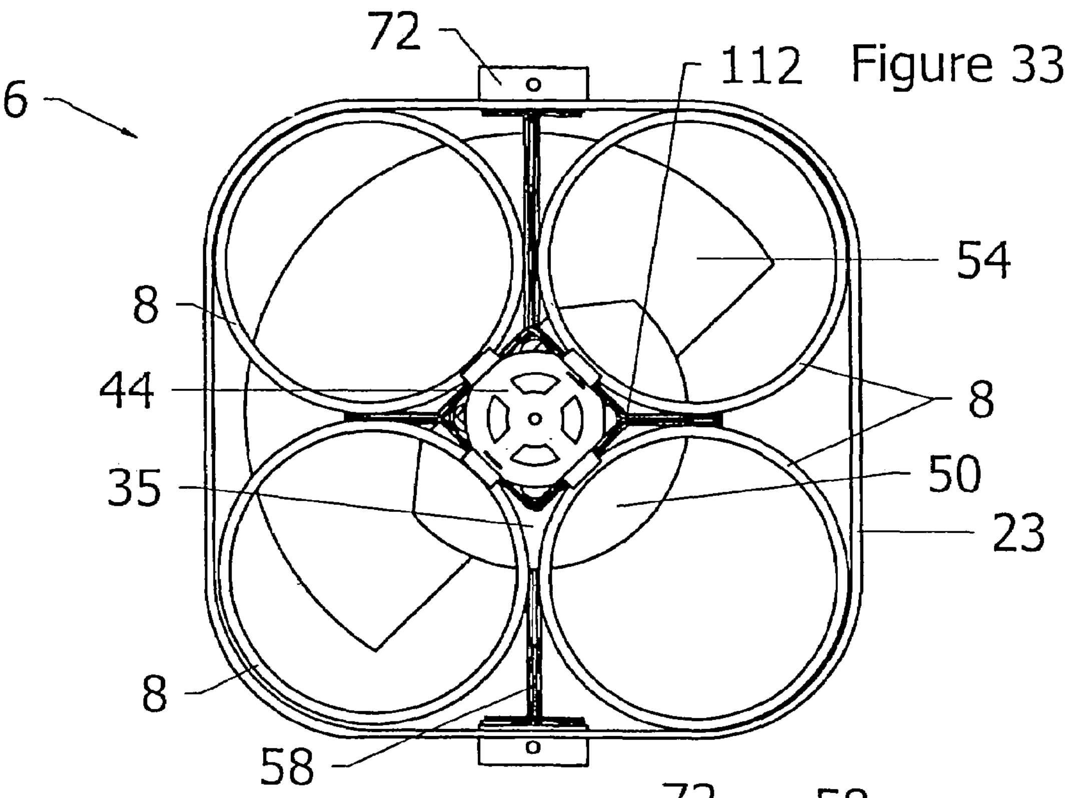
FIG. 33 is a top view of a cluster.
Figure 34:
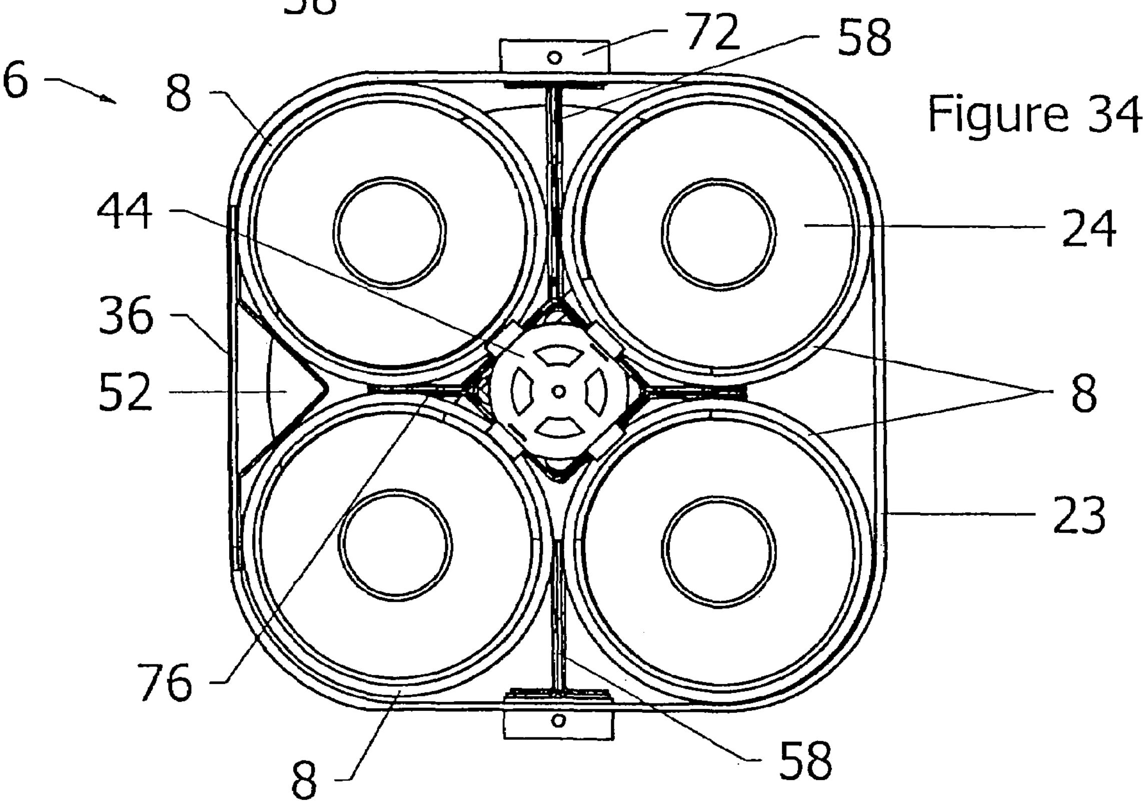
FIG. 34 is a top view of a cluster where the tubes contain containers.
Figure 35:
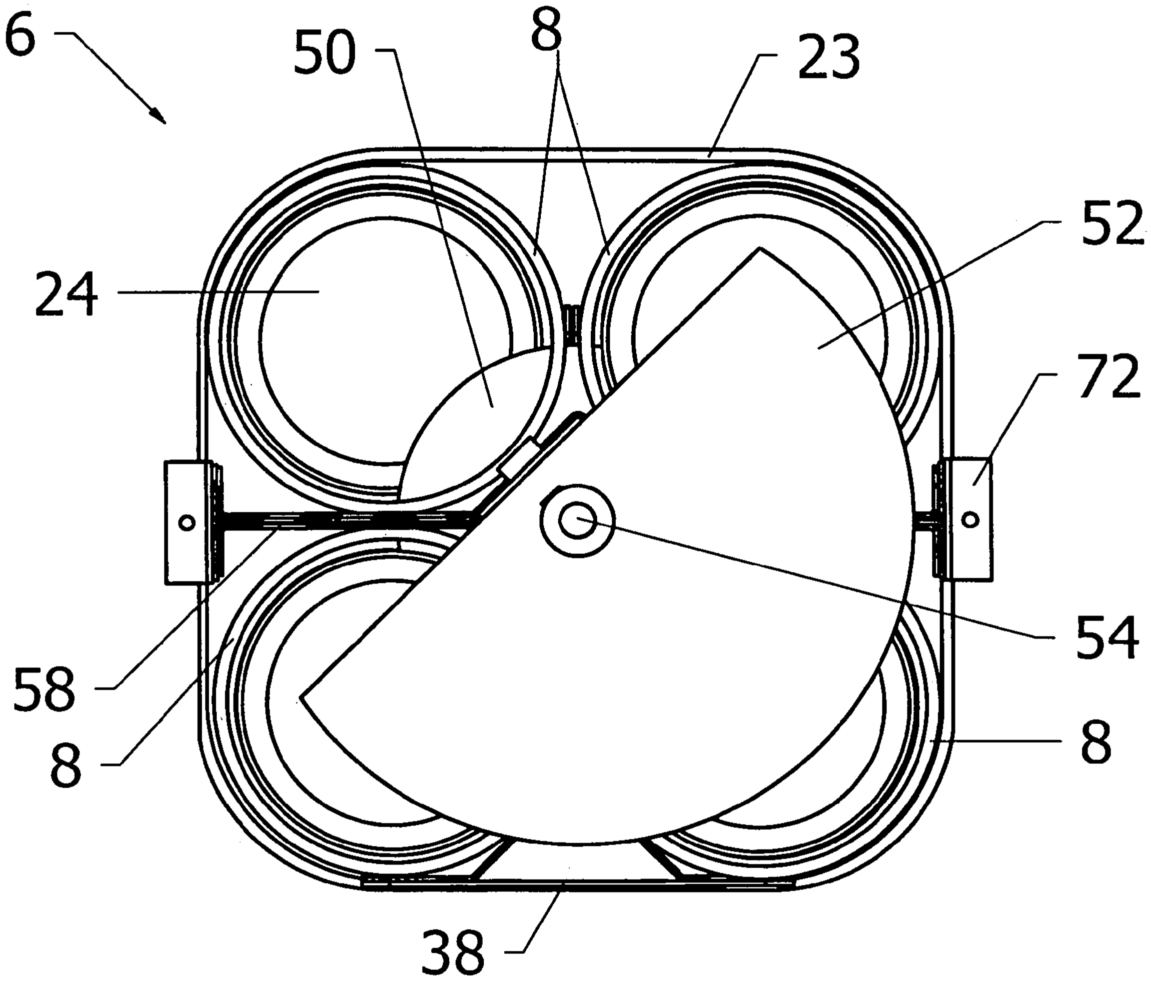
FIG. 35 is a bottom view of a cluster where the tubes contain containers.

In FIG. 32, the position of the actuator is identical to the position of the actuator in FIG. 31. However, in FIG. 32, the container 24 on the upper platform 50 has been deleted to expose the motor 44, the gear box 46 and more of the upper bracket 76. The containers 24 are shown in an upright position. In FIGS. 33 and 34, there is shown a top view of a cluster with no containers and top view of a cluster filled with containers respectively. In FIG. 35, there is shown a bottom view of the cluster 6 that is filled with containers 24. The same reference numerals are used in FIGS. 33, 34 and 35 to describe those components that are identical to the components of FIGS. 27, 28 and 31. In FIG. 35, it is clear that the containers in three of the tubes 8 are supported by the lower platform 52 and the container in one of the tubes 8 being in the upper left corner of FIG. 35 are supported by the upper platform 50. It can be seen from FIGS. 33 and 35 that the platforms 50, 52 are mounted 180 degrees apart from one another.

Figure 36:
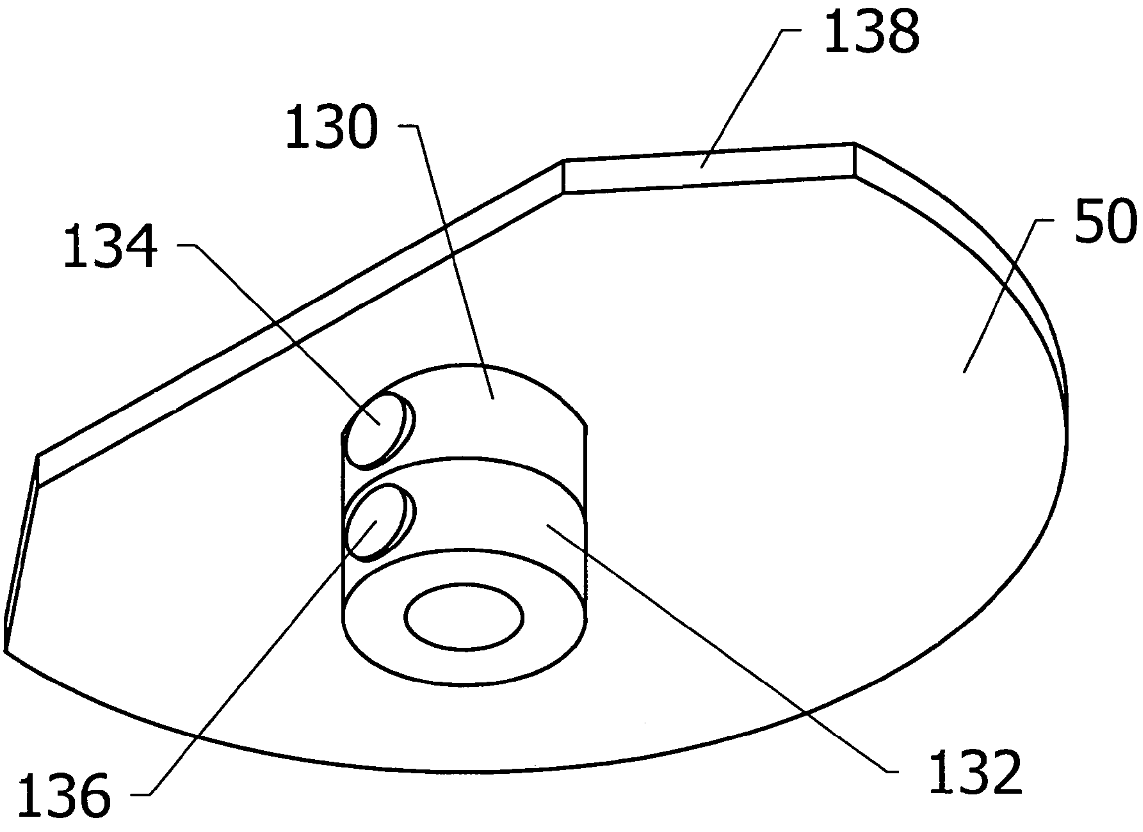
FIG. 36 is a perspective view of an upper platform when viewed from a bottom.

In FIG. 36, there is shown a perspective view of the upper platform 50 which has two shaft collars 130, 132 thereon containing set screws 134, 136 respectively. The upper platform 50 has bevelled corners 138 at a front thereof. The bevelled corners provide greater clearance for the corners of the upper platform 50 as the platform rotates past a neck of the containers (not shown in FIG. 36).

While the vertical columns are shown as tubes in the drawings and while the tubes are preferably made of plastic so that they are both lightweight and inexpensive, other vertical guides can be used instead of tubes. The vertical guides can be any arrangement that will provide a guide for containers stacked longitudinally on top of one another within the guide. Also, while the number of tubes shown in the drawings within a single cluster is four, the number of tubes can be some reasonable number other than four. For example, depending on the size of the housing and depending on the size of the tubes it might be feasible to have more or fewer than four tubes in a single cluster. An advantage of the dispensing machine of the present invention is that the machine can be controlled by a controller (not shown) to dispense a large selection of products. Various types of controllers can be utilized. The controller is considered to be conventional and is not further discussed. For example, in the arrangement shown in FIGS. 1 to 4, there are a total of fifteen clusters within the housing. Each one of those clusters can be filled with a different product and the controller can provide fifteen different selections. Alternatively, one might decide, for example, to fill nine of the clusters with containers having bottled water therein and the remaining six clusters with different products. The machine would then have a total of seven selections. Alternatively, machines can be designed with larger housings to house more clusters or the diameter of the vertical guides or tubes can be reduced because the container size being dispensed is reduced. With smaller diameter tubes, more clusters can be enclosed in the same size housing. More clusters can provide more selections. It might also be desirable to dispense containers of significantly different diameters within the same machine and the housing would therefore contain some clusters with tubes having a larger diameter than the tubes of other clusters. If the tubes have a larger diameter, fewer tubes and therefore fewer clusters will fit within the housing. The machine of the present invention provides significant versatility. Preferably, the brackets and spacers referred to in the present application are made from galvanized metal. When more tubes or fewer tubes are used in a cluster, the motor must be adjusted so that it rotates the appropriate distance for the number of tubes within the cluster. For example, if there are three tubes within a cluster, the motor would rotate 120 degrees for each activation. When a cluster contains fewer tubes of a particular size, more clusters can be contained within the same housing.

While the machine has been described for dispensing beverages, the containers can contain products other than beverages. The containers can contain hot or cold products or products that are at room temperature. Heating or refrigeration equipment contained within the machine is considered to be conventional and is not shown or described. While a cluster preferably has three or more vertical columns, it is possible to have a cluster with only two vertical columns or two tubes. For example two tubes might be used to form a cluster where a housing has been filled with clusters having four tubes, but there is sufficient space remaining for two tube clusters. When two tubes are used, the tubes can be spaced apart from one another with the actuator in between but, preferably, the tubes will be bound together and the actuator will be located off to one side of the tubes. The platforms must be mounted so that the upper platform can enter the vertical columns and preferably, the platforms will move back and forth between the two columns. The vertical columns can be any guide that provides a vertical path for the containers. When the statement is made that the containers have a neck, the neck is considered to be a narrowing of the container at a top sufficient to allow the upper platform to pass by the containers, preferably without contacting the containers, but at least without damaging the containers. While the containers are usually made of plastic, the machine will work with glass containers. When the tubes are tilted, they can be tilted to a gentle enough slope so that the glass containers will not break when they are placed in the tubes.

I claim:

1. A dispensing machine for elongated containers having a neck at a top thereof, said machine comprising:

(a) at least three vertical columns arranged adjacent to one another to form a cluster, said cluster having an interstice between said columns with an actuator mounted therein, said columns of said cluster being offset from one another, (b) said actuator having a rotatable shaft with a lower platform and an upper platform thereon, said columns having openings therein to receive said upper platform, each platform being substantially perpendicular to the longitudinal axis of each column of said cluster, (c) said actuator providing means to rotate said shaft and said platforms by successive steps to eject one container from said machine for each step, said lower platform being located at a base of said cluster, said upper platform being located above said lower platform by a distance that is less than a height of said containers, said lower platform being larger than said upper platform, (d) said containers being stored on top of one another in said columns in an upright position, said lower platform having a cutaway portion and being sized to block all of said columns except one column in each position of said shaft, said upper platform being located at a level of said neck and being oriented to block said one column that is not blocked by said lower platform in each position of said shaft, (e) a first bracket extending between said columns near said base, said first bracket having an enlarged central portion that substantially fills said interstice, said shaft extending through said central portion, (f) said first bracket having two ends extending outward from said central portion between said columns, said ends being removably affixed to a retainer, (g) said retainer supporting said cluster including said actuator, and said retainer and first bracket preventing said columns from twisting as said actuator rotates, said retainer preventing said first bracket from rotating as said actuator rotates.

2. A dispensing machine as claimed in claim 1 wherein said first bracket is affixed to said retainer in such a manner that after said first bracket is released from said retainer, said first bracket can be separated from said retainer by lifting said cluster and thereby said first bracket upward.

3. A dispensing machine as claimed in claim 2 wherein there are two inverted L-shaped ends on said first bracket, said retainer being sized and located to receive each end of said two ends of said first bracket, said two ends each being slidable beneath a flange located on either side of said bracket, said first bracket and said cluster being removable from said retainer by sliding said first bracket beyond an end of said flange before lifting said cluster and said first bracket upward.

4. A dispensing machine as claimed in claim 3 wherein said enlarged central portion of said first bracket has a square cross sectional shape when viewed from above.

5. A dispensing machine as claimed in claim 3 wherein said first bracket is made from galvanized metal.

6. A dispensing machine as claimed in claim 1 wherein there is a second bracket extending between said columns between said means to rotate said shaft and said upper platform, said second bracket having an enlarged central portion with two ends.

7. A dispensing machine as claimed in claim 1 wherein there are side brackets affixed to said retainer along each side of said cluster, said side brackets having a projection thereon to extend partially between said columns, there being four columns.

8. A dispensing machine as claimed in claim 1 wherein there are a plurality of clusters mounted from front to rear in said first retainers there being a top bracket located at or near a top of said clusters, said top bracket extending between said vertical columns and having a front and rear, said top bracket being affixed to a top rear plate at a rear of said cluster and a top of front plate at a front of said clusters, said top bracket extending through said top front plate and being affixed thereto by a wing nut, said plurality of clusters on one first retainer being a set.

9. A dispensing machine as claimed in claim 8 wherein said top bracket is removable without tools by removing said wing nut, said clusters being removable from said retainer without tools when said wing nut has been removed.

10. A dispensing machine as claimed in claim 1 wherein there is a spacer located in said interstice at a top of said columns.

11. A dispensing machine as claimed in claim 10 wherein said vertical columns are tubes.

12. A dispensing machine as claimed in claim 11 wherein a weight of said tubes and said actuator for each cluster rests entirely on said first bracket and therefore on said retainer.

13. A dispensing machine as claimed in claim 12 wherein there is a roller thrust bearing mounted on a top of a wall of said first bracket, said roller thrust bearing being concentrically mounted relative to said shaft so that said shaft can rotate relative to said roller thrust bearing with at least one collar being mounted on said shaft to rotate with said shaft immediately above said roller thrust bearing.

14. A dispensing machine as claimed in claim 13 wherein there are washers located on said shaft between said roller thrust bearing and said collar.

15. A dispensing machine as claimed in claim 1 wherein said machine has a plurality of clusters located within a housing.

16. A dispensing machine as claimed in claim 15 wherein, there are a plurality of clusters mounted on said first retainer from front to rear of said housing, said plurality of clusters on one first retainer being a set, said clusters of said set being tiltable forward with a top extending out of said housing in order to refill said clusters from said top.

17. A dispensing machine as claimed in claim 16 wherein there are several sets of clusters mounted side by side within a housing.

18. A dispensing machine as claimed in claim 17 wherein each retainer has a front plate extending downward therefrom, said front plate being pivotally mounted on a pivot bar extending horizontally beneath said front plate of said retainers so that each set can be tilted forward for filling with containers.

19. A dispensing machine for storing and dispensing containers longitudinally, where each container has a base and a top, said top being smaller than said base, said dispensing machine comprising:

(a) a plurality of vertical guides arranged in at least one cluster, said vertical guides being sized so that a plurality of containers can fit within each of said guides longitudinally with said base being located beneath said top, (b) two platforms rotatably mounted in a plane substantially normal to a longitudinal center axis of said at least one cluster, (c) an actuator connected to rotate said two platforms by part of one turn in said plane for each activation, (d) said two platforms being an upper platform and a lower platform, each of said two platforms having a cutaway portion, (e) said platforms being oriented so that the cutaway portion of said upper platform is vertically offset from the cutaway portion of said lower platform by at least the distance that said two platforms rotate in one activation, (f) said platforms rotating about a longitudinal axis that is substantially equidistant from each vertical guide of said plurality of vertical guides, (g) said upper platform being sized to rotate without damaging containers on said lower platform, (h) said platforms being vertically separated by less than a height of one container, (i) said vertical guides having an opening therein corresponding to a level of said upper platform to allow said upper platform to pass through said vertical guides, (j) said dispensing machine having an outlet for any containers that pass said lower platform, (k) a first bracket extending between said vertical guides near a base of said cluster, said first bracket having an enlarged central portion that abuts said vertical guides, said first bracket having two ends extending outward from said central portion, (l) at least one of said ends extending between said columns, said ends being removably affixed to a retainer, (m) said retainer supporting said cluster including said actuator, and said retainer and said first bracket preventing said columns from twisting as said actuator rotates.

20. A dispensing machine as claimed in claim 19 wherein said first bracket is affixed to said retainer in such a manner that after said first bracket is released from said retainer, said first bracket can be separated from said retainer by lifting said cluster and thereby said first bracket upward.

21. A dispensing machine as claimed in claim 19 wherein there are at least three vertical columns in said cluster, said cluster having an interstice between said vertical columns and said actuator extending along a longitudinal center axis of said interstice.

22. A dispensing machine as claimed in claim 21 wherein there are four vertical columns in said cluster and said vertical guides are tubes.

23. A method of constructing a dispensing machine for elongated containers having a neck at a top thereof, said machine having at least three vertical columns arranged adjacent to one another to form a cluster with an interstice between said columns, said containers being mounted on top of one another in said columns, an actuator being mounted within said interstice and having an upper platform and a lower platform that each extend beyond said interstice, said platforms being located a distance apart from one another of less than a height of one container, said method comprising constructing said vertical columns and said actuator so that a weight of said cluster, including the actuator, is on a first bracket, affixing said first bracket to a retainer at a base of said cluster, said retainer being constructed to tilt forward and tilting said cluster, said first bracket and said retainer forward for refilling said columns with containers, and releasing said first bracket from said retainer to remove said first bracket and said cluster from said retainer.

24. A method as claimed in claim 23 including the steps of locating a plurality of clusters from front to back in said retainer, each cluster having a first bracket, said plurality of clusters being a set and affixing each of said first brackets to said retainer, subsequently releasing one or more of said first bracket from said retainer to remove one or more clusters.

25. A method as claimed in claim 24 including the steps of locating several sets side by side in a housing, each set being constructed to tilt forward by having a retainer with a front plate extending downward therefrom, said front plate being pivotally mounted about a pivot bar located at a bottom of said front plate and mounting each retainer to pivot at said bottom of said front plate, tilting each set forward in succession, replenishing the containers in that set through a top of said columns and pivoting that set rearward to a dispensing position.

26. A method as claimed in claim 25 including the steps of using tubes for the vertical columns.

27. A method as claimed in claim 25 including the steps of mounting said clusters in each retainer so that each set is held in place by one attachment, opening the attachment for one set without tools and removing and replacing the clusters of that set.

* * * * *